US011102299B2

(12) United States Patent
Inomata et al.

(10) Patent No.: US 11,102,299 B2
(45) Date of Patent: Aug. 24, 2021

(54) DATA PROCESSING SYSTEM

(71) Applicant: HITACHI, LTD., Tokyo (JP)

(72) Inventors: Hirofumi Inomata, Tokyo (JP); Yusuke Funaya, Tokyo (JP); Tetsuro Honmura, Tokyo (JP)

(73) Assignee: HITACHI, LTD., Tokyo (JP)

( * ) Notice: Subject to any disclaimer, the term of this patent is extended or adjusted under 35 U.S.C. 154(b) by 0 days.

(21) Appl. No.: 16/323,999

(22) PCT Filed: Mar. 22, 2017

(86) PCT No.: PCT/JP2017/011519
§ 371 (c)(1),
(2) Date: Feb. 7, 2019

(87) PCT Pub. No.: WO2018/173164
PCT Pub. Date: Sep. 27, 2018

(65) Prior Publication Data
US 2019/0173949 A1 Jun. 6, 2019

(51) Int. Cl.
*H04L 29/08* (2006.01)
*G06F 9/54* (2006.01)
(52) U.S. Cl.
CPC .......... *H04L 67/1097* (2013.01); *G06F 9/544* (2013.01); *H04L 67/2842* (2013.01); *H04L 67/327* (2013.01); *G06F 2209/5011* (2013.01); *H04L 67/06* (2013.01)
(58) Field of Classification Search
CPC ............. H04L 67/1097; H04L 67/2842; H04L 67/327; H04L 67/06; G06F 9/544; G06F 2209/5011
See application file for complete search history.

(56) References Cited

U.S. PATENT DOCUMENTS

| 6,018,778 | A | * | 1/2000 | Stolowitz | ................ | G06F 3/061 |
| | | | | | | 710/52 |
| 6,341,342 | B1 | * | 1/2002 | Thompson | ............ | G06F 3/0613 |
| | | | | | | 707/999.202 |
| 6,601,104 | B1 | * | 7/2003 | Fallon | .................. | H04N 9/8042 |
| | | | | | | 709/231 |

(Continued)

FOREIGN PATENT DOCUMENTS

JP    2011-081579 A    4/2011

*Primary Examiner* — Blake J Rubin
(74) *Attorney, Agent, or Firm* — Volpe Koenig

(57) ABSTRACT

A data processing system includes a plurality of computers which include a processor and a memory, a storage device which is connected to the plurality of computers to store data, and a management computer controls the plurality of computers. The computer includes a node pool which can perform, stop, and delete one or more nodes. The node pool includes one or more first nodes which function as a data buffer. The management computer causes the node to measure a performance of data transmission between the data buffer and the storage device, determines a number of increased/decreased nodes on the basis of a measurement result of the performance, and notifies the node pool of a command of performing or deleting the first node according to the determined number of increased/decreased nodes. The node pool adjusts a number of the first nodes according to performing or deleting command.

8 Claims, 28 Drawing Sheets

(56) References Cited

U.S. PATENT DOCUMENTS

| | | | | |
|---|---|---|---|---|
| 8,103,788 B1* | 1/2012 | Miranda | G06F 13/385 | 709/234 |
| 8,261,038 B2* | 9/2012 | Breda | G06F 3/0605 | 711/112 |
| 9,286,261 B1* | 3/2016 | Tzelnic | G06F 11/108 | |
| 9,348,627 B1* | 5/2016 | Palekar | G06F 9/45533 | |
| 9,432,298 B1* | 8/2016 | Smith | H04L 49/9057 | |
| 9,465,549 B1* | 10/2016 | Faibish | G06F 3/067 | |
| 9,483,213 B1* | 11/2016 | Wharton | G06F 3/0605 | |
| 9,582,328 B1* | 2/2017 | Tao | G06N 5/02 | |
| 9,983,909 B1* | 5/2018 | Tyde, III | G06F 9/4881 | |
| 10,133,619 B1* | 11/2018 | Nagpal | G06F 11/079 | |
| 10,191,916 B1* | 1/2019 | Faibish | G06F 11/1484 | |
| 10,356,169 B1* | 7/2019 | Mistry | H04L 67/1095 | |
| 10,365,980 B1* | 7/2019 | Bromling | G06F 11/1662 | |
| 10,496,447 B2* | 12/2019 | Devireddy | G06F 9/4416 | |
| 10,558,478 B2* | 2/2020 | Gill | G06F 9/547 | |
| 2003/0189930 A1* | 10/2003 | Terrell | H04L 49/90 | 370/389 |
| 2007/0180453 A1* | 8/2007 | Burr | G06F 9/5027 | 718/105 |
| 2008/0162813 A1* | 7/2008 | Haustein | G06F 3/0664 | 711/115 |
| 2010/0316334 A1* | 12/2010 | Kewitsch | G02B 6/3502 | 385/78 |
| 2011/0004827 A1* | 1/2011 | Doerr | H04L 67/36 | 715/735 |
| 2011/0307677 A1* | 12/2011 | David | G06F 9/5016 | 711/163 |
| 2012/0059958 A1* | 3/2012 | Hnatko | G06F 13/1673 | 710/53 |
| 2012/0072652 A1* | 3/2012 | Celis | G06F 12/0893 | 711/103 |
| 2012/0124251 A1* | 5/2012 | Hnatko | G11C 7/106 | 710/29 |
| 2014/0047342 A1* | 2/2014 | Breternitz | G06F 9/5061 | 715/735 |
| 2014/0324793 A1* | 10/2014 | Glazemakers | G06F 3/0641 | 707/692 |
| 2015/0160872 A1* | 6/2015 | Chen | G06F 3/0607 | 711/114 |
| 2015/0180714 A1* | 6/2015 | Chunn | H04L 67/1097 | 709/221 |
| 2015/0248402 A1* | 9/2015 | Patterson, III | G06F 16/1827 | 707/640 |
| 2015/0254088 A1* | 9/2015 | Chou | G06F 3/061 | 709/212 |
| 2016/0092468 A1* | 3/2016 | Hildebrand | G06Q 10/00 | 707/633 |
| 2016/0267132 A1* | 9/2016 | Castellanos | G06F 16/24552 | |
| 2016/0269228 A1* | 9/2016 | Franke | G06F 9/5072 | |
| 2016/0306678 A1* | 10/2016 | Hira | G06F 9/5083 | |
| 2017/0123675 A1* | 5/2017 | Glazemakers | G06F 3/0619 | |
| 2017/0262221 A1* | 9/2017 | Zhao | G06F 3/0647 | |
| 2017/0371540 A1* | 12/2017 | Ding | G06F 3/067 | |
| 2018/0046503 A1* | 2/2018 | Feng | G06F 9/5077 | |
| 2018/0067881 A1* | 3/2018 | Frandzel | G06F 13/1642 | |
| 2018/0077235 A1* | 3/2018 | Nachimuthu | G06F 12/00 | |
| 2018/0113640 A1* | 4/2018 | Fernandez | G06F 3/067 | |
| 2018/0113804 A1* | 4/2018 | Hsu | G06F 12/0253 | |
| 2018/0159729 A1* | 6/2018 | Deshmukh | H04L 61/1511 | |
| 2018/0203641 A1* | 7/2018 | Petrocelli | G06F 3/067 | |
| 2018/0276019 A1* | 9/2018 | Ali | G06F 16/2365 | |
| 2018/0367363 A1* | 12/2018 | Jaeger | H04L 41/0803 | |
| 2019/0034237 A1* | 1/2019 | Siddappa | H04L 67/1031 | |
| 2019/0042126 A1* | 2/2019 | Sen | G06F 3/0605 | |
| 2019/0121541 A1* | 4/2019 | Zhao | G06F 12/1081 | |
| 2019/0155613 A1* | 5/2019 | Olderdissen | G06F 21/53 | |
| 2019/0235777 A1* | 8/2019 | Wang | G06F 13/4022 | |
| 2019/0266496 A1* | 8/2019 | Florissi | G06F 16/252 | |
| 2019/0332473 A1* | 10/2019 | Yang | H03M 13/356 | |
| 2019/0340136 A1* | 11/2019 | Irwin | G06F 3/0683 | |
| 2020/0026446 A1* | 1/2020 | Jawahar | G06F 3/0632 | |
| 2020/0027014 A1* | 1/2020 | Wen | G06F 9/50 | |
| 2020/0028894 A1* | 1/2020 | Memon | H04L 67/10 | |
| 2020/0034197 A1* | 1/2020 | Nagpal | G06N 20/00 | |

* cited by examiner

FIG. 7

"DATA STORAGE LIST" 900

| DATA STORAGE SYSTEM ID 901 | PORT IP ADDRESS 902 | KIND OF THE STORAGE SYSTEM 903 | KIND OF THE RECORDING MEDIA 904 | DATA BLOCK SIZE 905, 906 | DATA TRANSFER RATE FOR THE MEDIA 907 | PERFORMANCE PARAMETERS | |
|---|---|---|---|---|---|---|---|
| | | | | | | DEFAULT NUMBER OF STORAGE NODES DEPLOYED | |
| 07000333 | 192.168.1.100:3260 | "TAPE LIBRARY" | "LTO8" | 256KB | 525MB/SEC | 4 | ⋮ |
| 07000555 | 192.168.1.110:3260 | "VIRTUAL TAPE LIBRARY" | "LTO5" | 256KB | 1000MB/SEC | 5 | ⋮ |
| 07000777 | 192.168.1.120:3260 | "OPTICAL DISC LIBRARY" | "AD" | 64KB | 9MB/SEC | 1 | ⋮ |
| ⋮ | | | | | | | |

908

[NOTE] 'AD' MAY MEAN A ARCHIVAL DISC (OPTICAL DISC).
[NOTATION] A MARK ".." MAY MEAN "DON'T CARE".

FIG. 8

"NODE POOL LIST" 1000

| NODE POOL ID 1001 | MANAGEMENT PORT IP ADDRESS 1002 | AUTHENTICATION INFORMATION FOR MANAGEMENT PORT 1003 | |
|---|---|---|---|
| | | USER ID 1004 | PASSWORD 1005 |
| 08000333 | 192.168.1.33:8888 | ADMIN | XXXXXXX |
| 08000555 | 192.168.1.34:8888 | ADMIN | YYYYYYY |
| 08000777 | 192.168.1.35:8888 | ROOT | ZZZZZZZ |
| ... | ... | ... | ... |

[NOTE] A DATA BUFFER LOCATION ID MAY BE REPLACED BY A PHYSICAL SERVER ID.
[NOTATION] A MARK "..." MAY MEAN "DON'T CARE".

FIG. 9

"DATA BUFFER LIST" 1100

| DATA BUFFER ID 1101 | ACCESS PATH INFORMATION 1102 | NODE ID OF HANDLER NODE 1103 | NODE ID OF STORAGE NODE 1104 | STATUS 1105 | CREATION DATE 1106 |
|---|---|---|---|---|---|
| 08000333 | 172.17.0.2:8789 | 11000333 | 11000444 | ACTIVE | 2016/11/10 |
| 08000333 | 172.17.0.2:8789 | 11000333 | 11000555 | ACTIVE | 2016/11/10 |
| 08000333 | 172.17.0.2:8789 | 11000333 | 11000666 | ACTIVE | 2016/11/10 |
| 08000444 | ... | ... | ... | DELETED | 2016/03/22 |
| ... | ... | ... | ... | ... | ... |

[NOTATION] A MARK "..." MAY MEAN "DON'T CARE"

FIG. 10

"LINKAGE NODE LIST" 1200

| NODE ID OF LINKAGE NODE 1201 | NODE ID OF DATA PROCESSING NODE 1202 | DATA STORAGE SYSTEM ID 1203 | DATA BUFFER ID 1204 | CORRECTION FACTOR 1205 | STATUS 1206 | CREATION DATE 1207 | ... |
|---|---|---|---|---|---|---|---|
| 00000777 | ... | ... | ... | 1.2 | DELETED | 2016/03/22 | ... |
| 12000333 | 11000222 | 07000333 | 09000333 | 1.5 | ACTIVE | 2018/11/10 | ... |
| 12000555 | ... | ... | ... | -1.0 | ACTIVE | 2018/11/10 | ... |

[NOTE] A NEGATIVE VALUE MAY MEAN NO MEASUREMENT RESULT.
[NOTATION] A MARK "..." MAY MEAN "DON'T CARE".

FIG. 11

"NODE LIST" 1300

| NODE ID 1301 | KIND OF NODE 1302 | NODE POOL ID 1304 | STATUS 1305 | CREATION DATE 1306 | |
|---|---|---|---|---|---|
| 00000777 | | | DELETED | 2018/03/22 | : |
| 11000222 | "DATA PROCESSING NODE" | 08000333 | ACTIVE | 2016/11/01 | : |
| 11000333 | "HANDLER NODE" | 08000777 | ACTIVE | 2016/11/10 | : |
| 11000444 | "STORAGE NODE" | 08000333 | ACTIVE | 2016/11/10 | : |
| 11000555 | "STORAGE NODE" | 08000555 | ACTIVE | 2016/11/10 | : |
| 11000666 | "STORAGE NODE" | 08000777 | ACTIVE | 2016/11/10 | : |
| 12000333 | "LINKAGE NODE" | 08000555 | ACTIVE | 2016/11/10 | : |
| : | | | | | |

[NOTATION] A MARK "..." MAY MEAN "DON'T CARE".

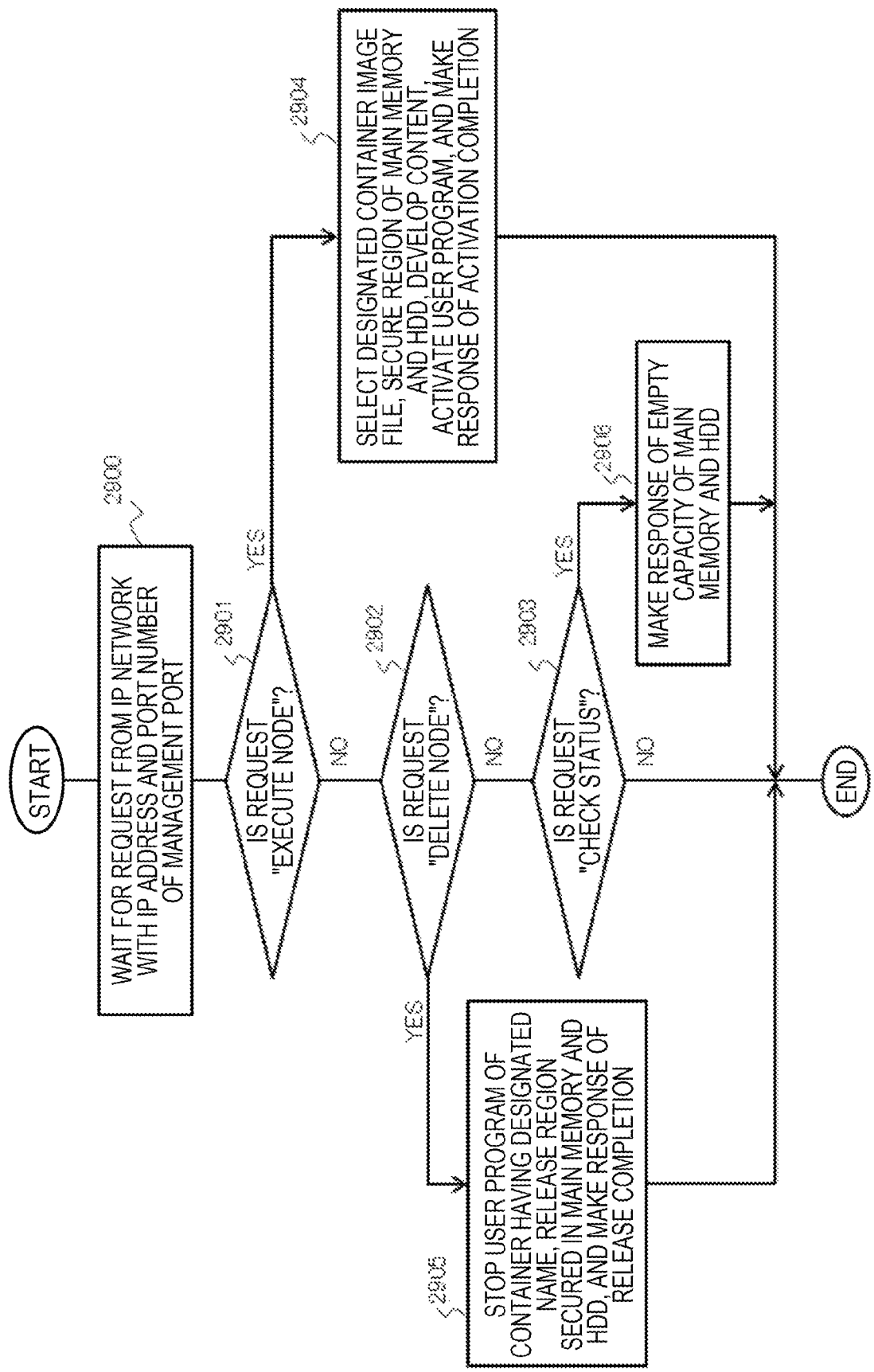

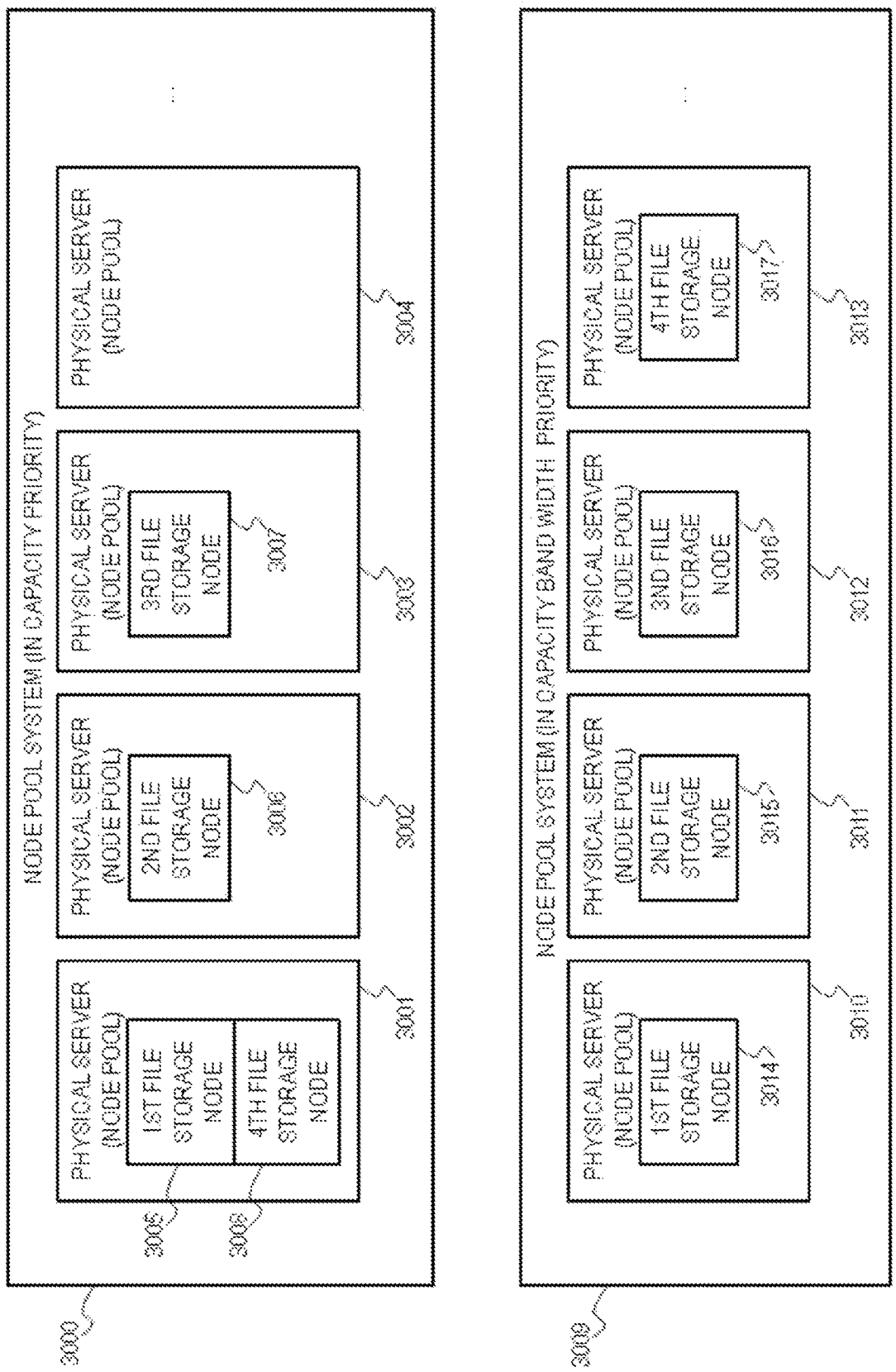

DATA PROCESSING SYSTEM

TECHNICAL FIELD

The invention relates to an access to big data in a software defined infrastructure platform and a hyper-converged or converged platform.

BACKGROUND ART

In Information Technology (IT) fields in these days, a virtualization technology has become widespread, and flexible IT resources have become available. Further, as a container technology has become more widespread, servers, storages, networks, virtual software, and management tools are packaged in the hyper-converged platform which employs the container technology, and a high agile IT system can be deployed.

On the other hand, it is difficult to determine whether a physical IT resource suitable to a user's requirement is assigned to the user when the IT system is deployed. An IT resource different from a user's expectation is assigned, and unexpected failure may occur.

In addition, big data analysis becomes popular, and there is a need to acquire vast amount of data at a high speed. In the big data analysis, it is required to deploy a data buffer which mediates data access and satisfies appropriate performance requirements in order to reduce the occurrence of performance failure.

Further, the data buffer is also an element which constructs the IT system for analyzing data, and it is also required to deploy the data buffer in a short time due to the needs for shortening the deployment of the IT system nowadays. PTL 1 discloses a method of automating a deploying operation of the virtualized IT system on the basis of a template.

CITATION LIST

Patent Literature

PTL 1: JP 2011-081579 A

SUMMARY OF INVENTION

Technical Problem

In order to reduce a performance failure in an access to vast amount of data, the data buffer is necessary in a place close to that for the execution of data processing. The sizing of the data buffer varies according to the type of an external storage device where the data is stored or a recording media that is used, is complicated and difficult. In addition, the complexity is more increased in a large-scaled computer system. Further, before the data buffer starts to be used, it is necessary for the sizing of the data buffer to determine an initial value which is less waste in capacity and hard to cause a performance failure.

An object of the invention is to provide a required data buffer which does not need to specify the performance and the specification of a data storage system.

Solution to Problem

According to the invention, there is provided a data processing system which includes a plurality of computers which includes a processor and a memory, a storage device which is connected to the plurality of computers to store data, and a management computer controls the plurality of computers. The computer includes a node pool which is possible to perform, stop, and delete one or more nodes. The node pool includes one or more first nodes which functions as a data buffer. The management computer causes the node to measure a performance of data transmission between the data buffer and the storage device, determines a number of increased/decreased nodes on the basis of a measurement result of the performance, and notifies the node pool of a command of performing or deleting the first node according to the determined number of increased/decreased nodes. The node pool adjusts a number of the first nodes according to the performing or deleting command notified from the management computer.

Advantageous Effects of Invention

According to the invention, the operation manager of a data processing system can use a required data buffer which is prepared according to a deploy of a first node pool by the data processing system and a measurement result of the performance without designating a performance and a specification of a connected storage device, and can suppress a failure in the performance, and can expect labor saving of the operation manager.

BRIEF DESCRIPTION OF DRAWINGS

FIG. 7 is a diagram illustrating an example of a data storage list according to an embodiment of the invention.

FIG. 8 is a diagram illustrating an example of a node pool list according to an embodiment of the invention.

FIG. 9 is a diagram illustrating an example of a data buffer list according to an embodiment of the invention.

FIG. 10 is a diagram illustrating an example of a linkage node list according to an embodiment of the invention.

FIG. 11 is a diagram illustrating an example of a node list according to an embodiment of the invention.

FIG. 27 is a flowchart illustrating an example of a process of a container platform program according to an embodiment of the invention.

FIG. 28 is a block diagram illustrating an example of a container layout according to an embodiment of the invention.

DESCRIPTION OF EMBODIMENTS

Hereinafter, embodiments of the invention will be described using the accompanying drawings.

Figure 1:
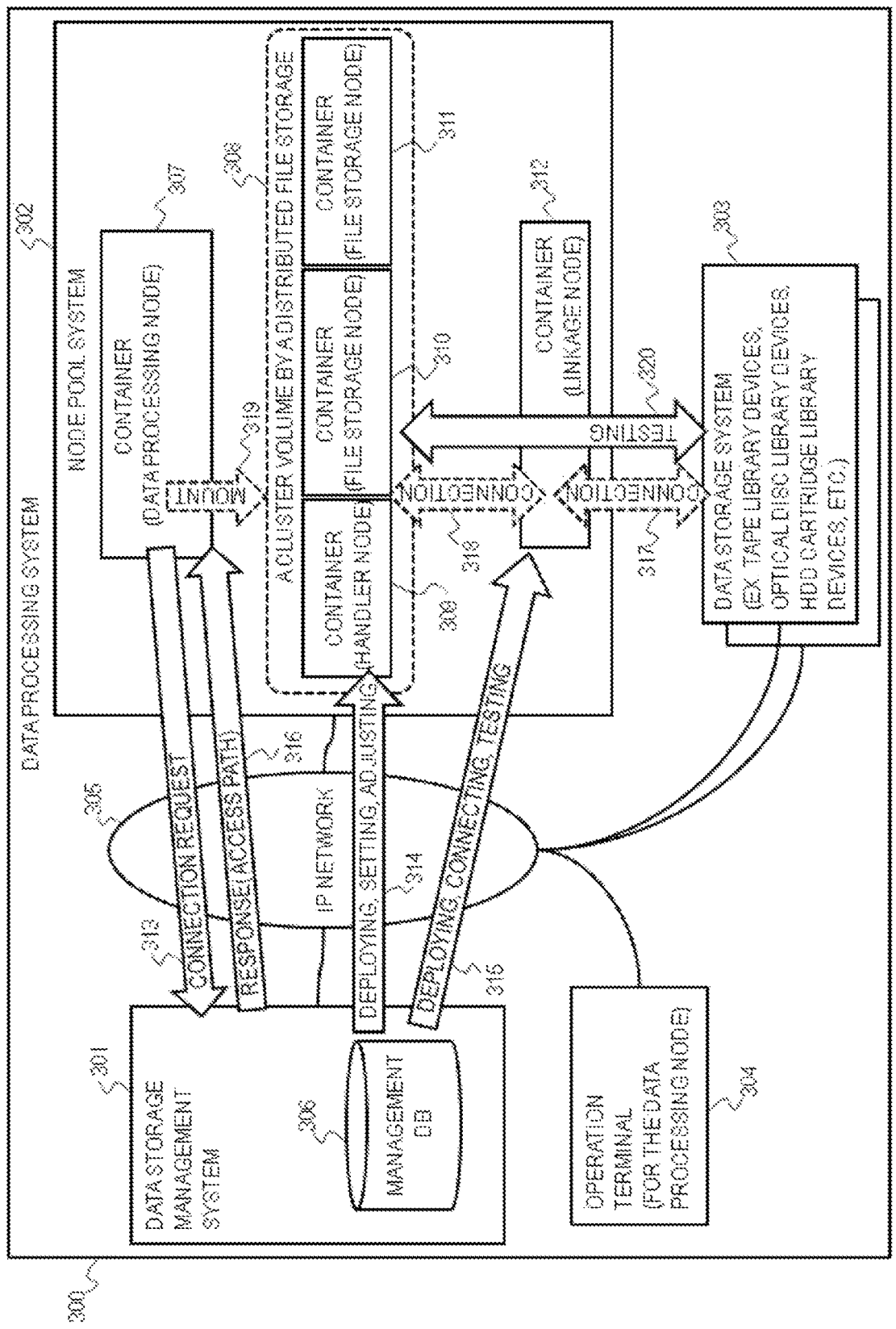
FIG. 1 is a block diagram illustrating an example of a computer system according to an embodiment of the invention.

FIG. 1 is a block diagram illustrating a data processing system according to an embodiment of the invention. A data processing system 300 includes at least a data storage management system (management node) 301 which includes a management database 306, a node pool system 302 in which one or more containers operate, one or more data storage systems 303, one or more operation terminals 304, and an Internet protocol network 305.

In this embodiment, in order to help with explanation, the container operating in the node pool system 302 will be described by narrowing down to four types of a data processing node 307, a handler node 309, and one or more file storage nodes 310 and 311. Further, this embodiment is not limited to the configuration, but five or more types of containers may operate. In addition, hereinafter, the Internet protocol network 305 will be abbreviated to a network 305.

Next, the outline of the process in FIG. 1 will be described.

A data flow for accessing data in the data storage system 303 from the operation terminal 304 is input to the data processing node 307. The data processing node 307 performs the data flow which is received from the operation terminal 304.

The data processing node 307 transmits a connection request 313 to request a user of the data storage system 303 to the data storage management system 301 when the step of accessing to the data in the data storage system 303 is performed in the data flow.

When receiving the connection request 313, the data storage management system 301 activates the containers of the handler node 309 and the one or more file storage nodes 310 and 311 to the node pool system 302 and forms a cluster 308 which functions as a data buffer (314).

Next, the data storage management system 301 activates the container of a linkage node 312 in the node pool system 302, and establishes connections 318 and 317 between the cluster 308 and the data storage system 303. Then, the data storage management system 301 causes the cluster 308 to test the performance of the data storage system 303 (320), and measures a difference between the performance and a request performance stored in the management database 306 (315).

The data storage management system 301 calculates a difference between a test result and the request performance stored in the management database 306. The data storage management system 301 instructs the cluster 308 to add the file storage node when the performance of the test result is insufficient. When the performance of the test result is excessive, the data storage management system 301 instructs the cluster 308 to delete the file storage node.

The data storage management system 301 records the difference between the test result and the request performance to the management database 306. When there is a request for a similar configuration, the data storage management system 301 reuses the configuration and the cluster 308.

After ending the configuration of the cluster 308, the data storage management system 301 returns access path information to the cluster 308 to the data processing node 307 through a response 316. The data processing node 307 performs a mount 319 on the cluster 308 on the basis of the access path information of the response 316 to be connected to the cluster 308 as a distributed file storage. With this configuration, the cluster 308 makes an access to the data storage system 303 to function as a data buffer of the data processing node 307.

In the above description, the outline of the data processing system 300 will be described.

Hereinafter, the description will be given using a flowchart together with the configurations of the components. Further, in the following description, the well-known or general technique such as Ceph ("Architecture Ceph Documentation", http://docs.ceph.com/docs/hammer/architecture/ (Red Hat, Inc.)) may be applied to the process and the specification of a distributed file storage node program 510 (see FIG. 3) realizing the cluster 308 in this embodiment.

Figure 2:
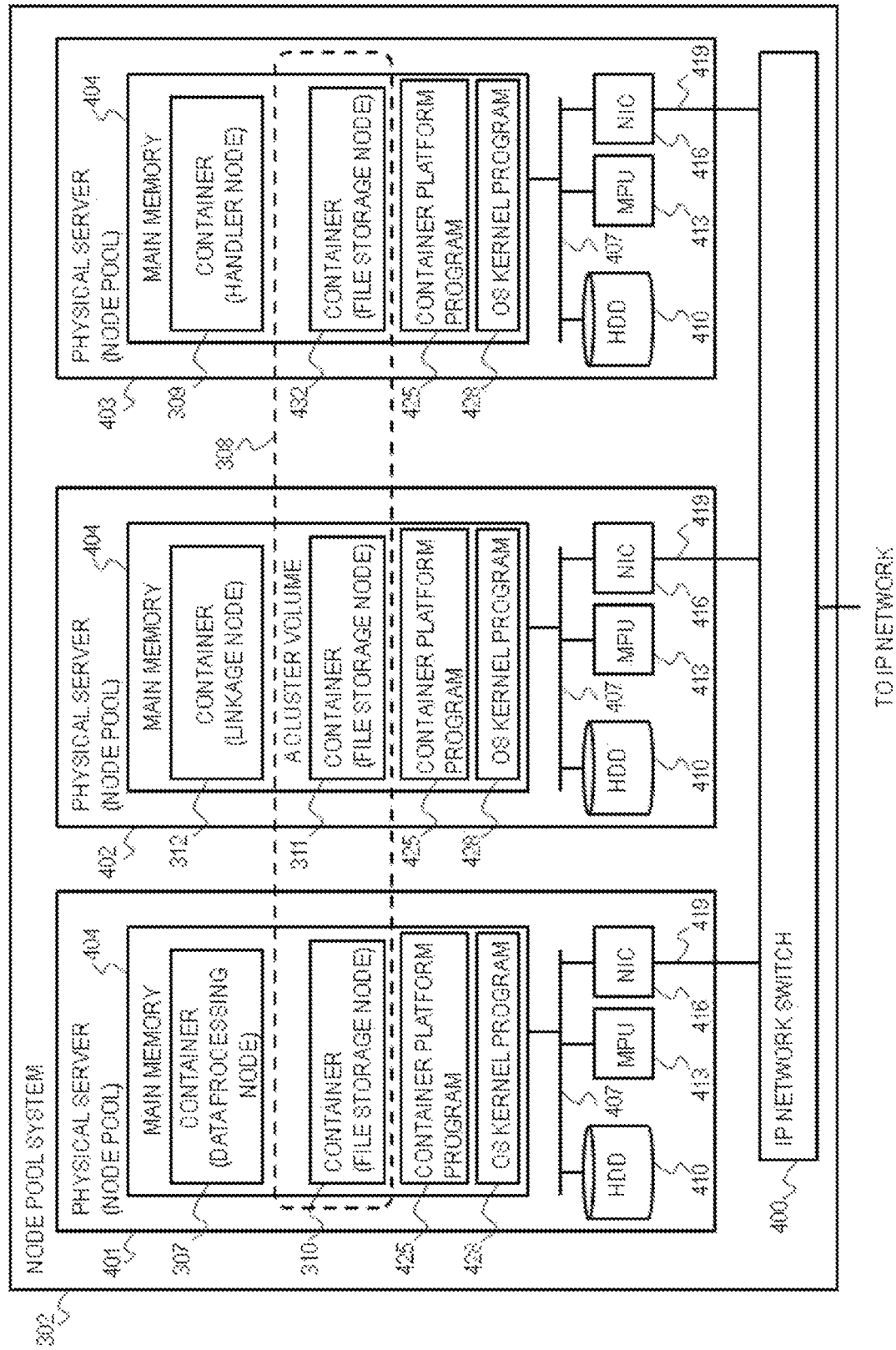
FIG. 2 is a block diagram illustrating an example of a configuration of a node pool system according to an embodiment of the invention.

The well-known and general technique such as a docker engine ("WHAT IS DOCKER?", https://www.docker.com/what-docker (Docker, Inc.)) may also be applied to the process of a container platform program 425 illustrated in FIG. 2.

In addition, a magnetic tape library device of the well-known or general technique such as "SMC-3" (Standard: ANSI INCITS 484, Information technology—SCSI Media Changer Commands-3 (SMC-3)" (ANSI)) may also be applied to the data storage system 303.

FIG. 2 is a block diagram illustrating an example of the inner configuration of the node pool system 302. The node pool system 302 includes one or more physical servers 401, 402, and 403 and a network switch 400 which connects the physical servers 401 to 403 and the network 305 (see FIG. 1).

The physical servers 401, 402, and 403 each are computers which include a main memory 404, HDDs 410, 411, and 412, an MPU 413, an NIC 416, a data bus 407 which connects the main memory, the HDD, the MPU, and the NIC, and a data path 419 which connects the NIC and the network switch 400.

In this embodiment, the physical servers 401, 402, and 403 are configured similarly in order to help with explanation, and may be configured differently if necessary resources are included. In addition, the physical servers 401, 402, and 403 will be called a node pool hereinafter.

The main memory 404 of each node pool loads an OS kernel program 428 and the container platform program 425. In addition, the main memory 404 loads each container which is performed in each node pool. Each program loaded to the main memory 404 is performed by the MPU 413.

In FIG. 2, as an example, the main memory 404 of the physical server 401 loads the data processing node 307 and a file storage node 432. The main memory 404 of the physical server 402 loads a linkage node 312 and the file storage node 311. The main memory 404 of the physical server 403 loads the handler node 309 and the file storage node 432.

Further, the container platform program 425 is a program corresponding to the above docker engine. Further, a container platform other than the docker engine may be employed.

Further, in FIG. 1, the cluster 308 forming the data buffer is configured by the file storage nodes 310 and 311 and the handler node 309. However, the cluster 308 may include the file storage nodes 310, 311, and 432 as illustrated in FIG. 2 as the configuration of the data buffer.

One data buffer (the cluster 308) needs at least one handler node 309. The handler node 309 controls adding and deleting of the file storage nodes 310 and 311 in the cluster 308.

Figure 3:
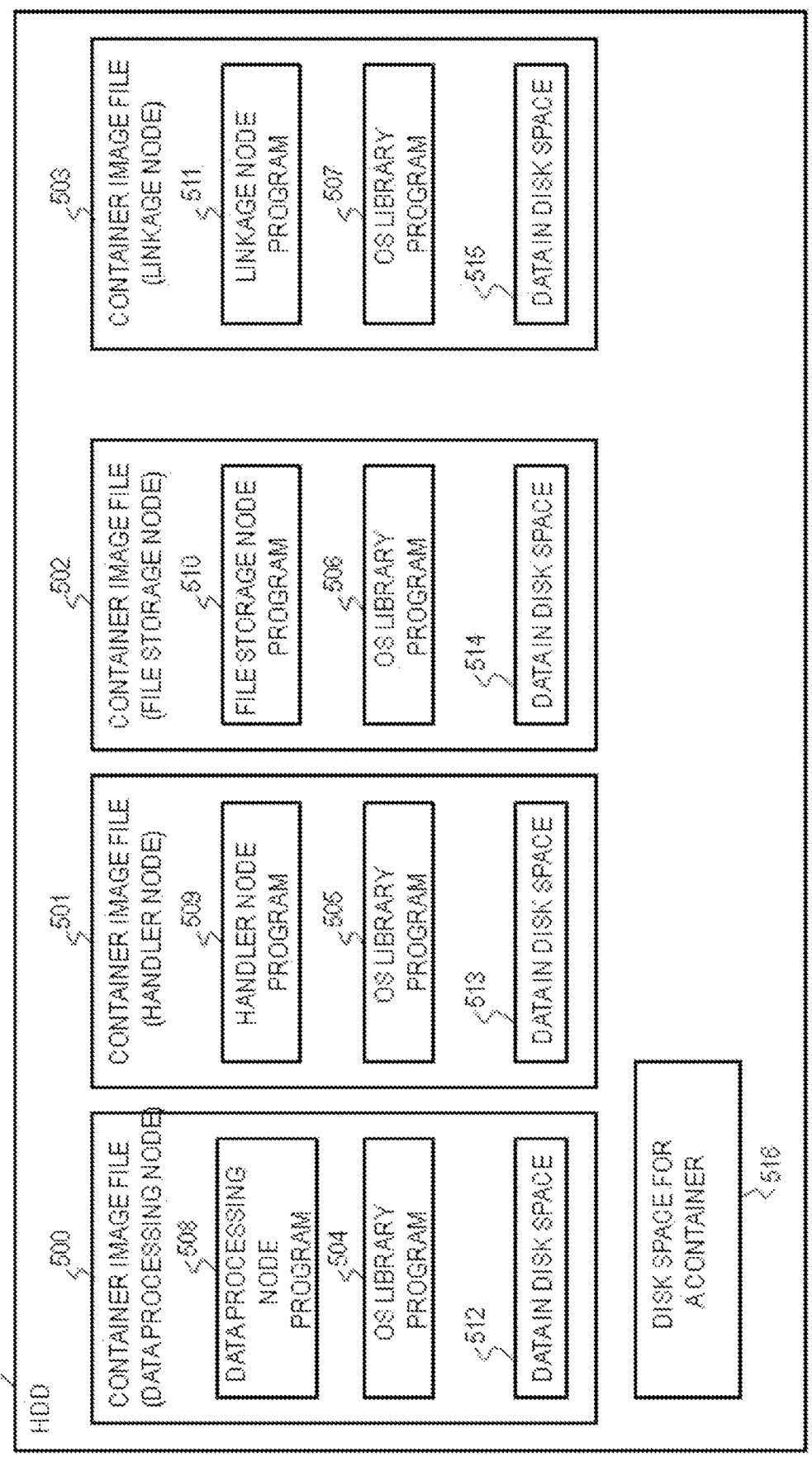
FIG. 3 is a block diagram illustrating an example of data stored in a hard disk drive (HDD) according to an embodiment of the invention.

Data stored by each HDD 410 of FIG. 2 will be described using FIG. 3. FIG. 3 is a block diagram illustrating an example of data to be stored in the HDD 410.

In this first embodiment, in order to help with explanation, the description will be given about an example where the HDD 410 stores the similar container image files.

Further, this embodiment is not limited to the above configuration. The container image file may be operated to be stored by the HDD 410 as needed. Each HDD 410 stores container image files 500, 501, 502, and 503 to store one or more disk space (Disk Space for a container) 516 where the container operated in each node pool is developed.

The container image file 500 is an image file for the data processing node 307, and includes a data processing node program 508, an OS library program 504, and a disk space (Data in Disk Space) 512. The OS library program 504 is a program which provides a programming interface to cause a user's program to use the function of the OS, and which is distributed together with the OS. For example, the standard C library is typical of the Unix OS.

The container image file 501 is an image file for the handler node 309, and includes a handler node program 509, an OS library program 505, and a disk space 513.

The container image file 502 is an image file for the file storage nodes 310 and 311, and includes a file storage node program 510, an OS library program 506, and a disk space 514.

The container image file 503 is an image file for the linkage node 312, and includes a linkage node program 511, the OS library program 506, and the disk space 515.

In FIG. 2, the functional units of the data processing node 307 and the file storage node 310 are loaded as a program to the main memory 404 in the physical server 401.

The MPU 413 operates as a functional unit which provides a predetermined function by performing processing according to the program of each functional unit. For example, the MPU 413 functions as the data processing node 307 by performing processing according to the data processing node program 508. The other programs are performed similarly. Further, the MPU 413 operates also as a functional unit which provides each function of the plurality of processing performed by the programs. A computer and a computer system are devices or systems which include these functional units.

The program and information of tables to realize each function of the physical server 401 may be stored in a memory device such as a storage subsystem or a nonvolatile semiconductor memory, a hard disk drive, an SSD (Solid State Drive), or in a non-transitory computer-readable medium such as an IC card, an SD card, and a DVD.

In the above description, the configuration of the node pool system 302 has been described.

Figure 4:
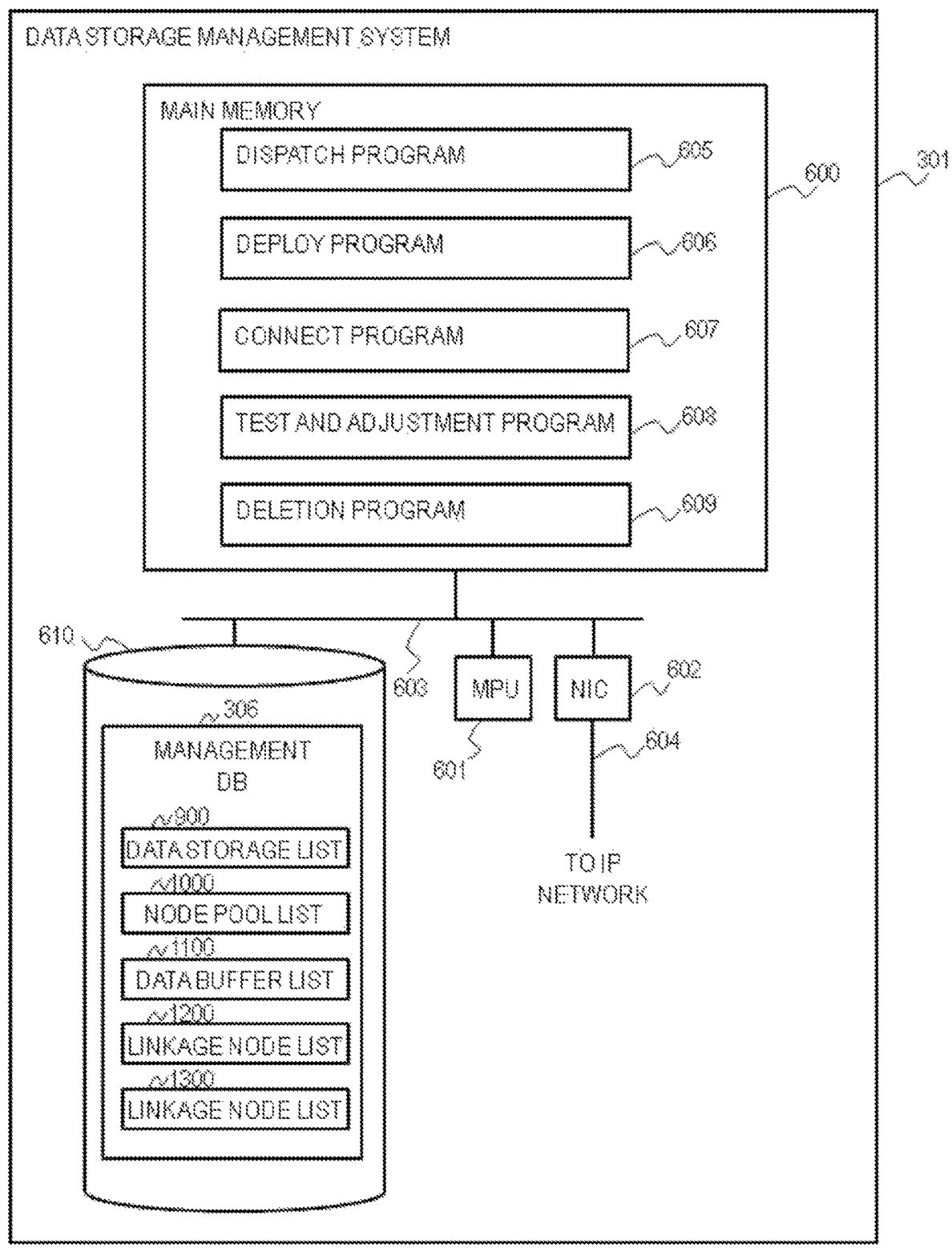
FIG. 4 is a block diagram illustrating an example of a configuration of a data storage management system according to an embodiment of the invention.

FIG. 4 is a block diagram illustrating an example of a configuration of the data storage management system 301. The data storage management system 301 includes a main memory 600, an MPU 601, an NIC 602, an HDD 610 which stores the management database 306, and a data bus 603 which connects these components. The NIC 602 is connected to the network 305 through a data path 604. Further, the management port may be assigned to the NIC 602.

In addition, the main memory 600 includes at least a dispatch program 605, a deploy program 606, a connect program 607, a test and adjust program 608, and a deletion program 609. Each process will be described below.

In addition, the management database 306 includes a data storage list 900, a node pool list 1000, a data buffer list 1100, a linkage node list 1200, and each DB table of a node list 1300.

In the above description, the configuration of the data storage management system 301 has been described.

Figure 5:
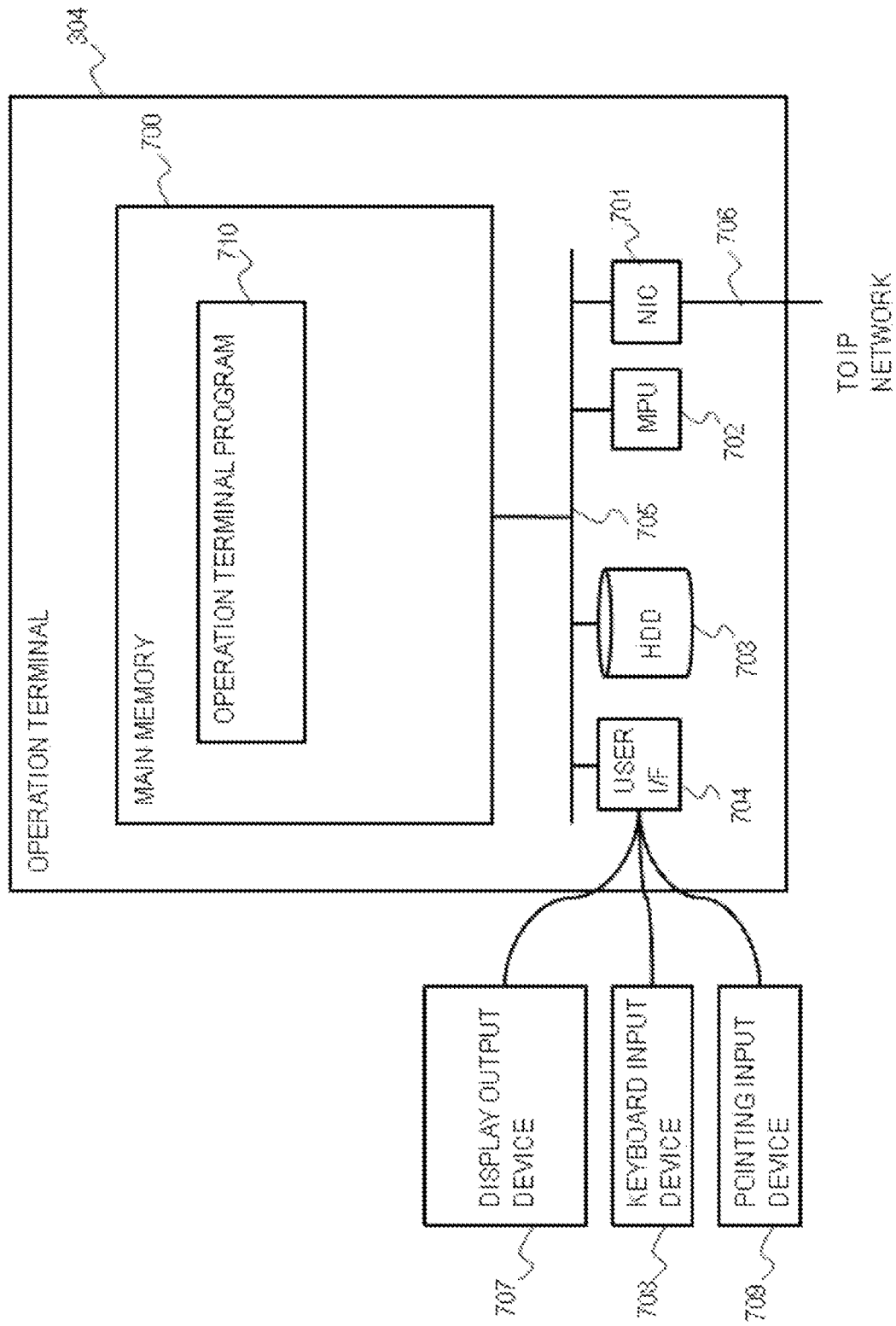
FIG. 5 is a block diagram illustrating an example of a configuration of an operation terminal according to an embodiment of the invention.

FIG. 5 is a block diagram illustrating an example of a configuration of the operation terminal 304.

The operation terminal 304 includes a main memory 700, an NIC 701, an MPU 702, an HDD 703, a user interface (User IF) 704, a data bus 705 which is connected to these components, and a data path 706 which connects an NIC 701 and the network 305.

The user interface 704 connects a display (Display Output Device) 707, a keyboard (Keyboard Input Device) 708, and a pointing device (Pointing Input Device) 709. Further, a display device having a touch panel function may be used.

The main memory 700 loads an operation terminal program 710. The operation terminal program 710 transmits an input from the keyboard 708 and the pointing device 709 to the node pool system 302, or outputs the input to an operation screen.

In the above description, the configuration of the operation terminal 304 has been described.

Figure 6:
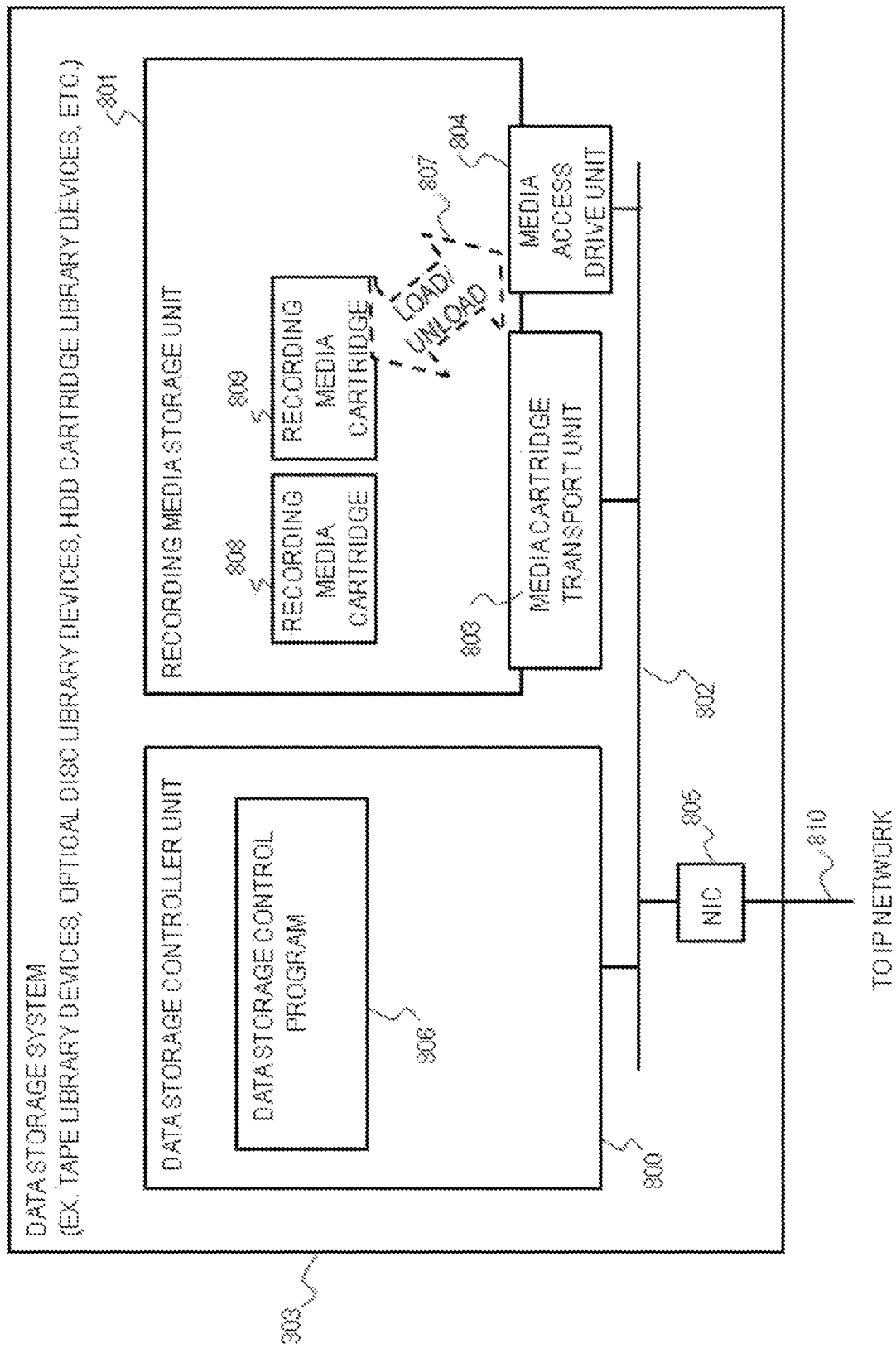
FIG. 6 is a block diagram illustrating an example of a configuration of a data storage system according to an embodiment of the invention.

Next, FIG. 6 is a block diagram illustrating an example of a configuration of the data storage system 303. This embodiment is an example in which a tape library device in conformity with the "SCSI Media Changer Commands".

The data storage system 303 includes a data storage controller unit 800 which is an embedded microcomputer, recording media cartridges 808 and 809, a recording media storage unit 801 which contains the recording media cartridges 808 and 809, a media access drive unit 804 which is a magnetic tape drive, a media cartridge transport unit 803 which is a conveyance unit of the recording media cartridges 808 and 809, an NIC 805, and a data bus 802 which connects these components. A data path 810 connects the NIC 805 and the network 305.

The media cartridge transport unit 803 loads or unloads (Transport 807) the recording media cartridges 808 and 809 contained in the recording media storage unit 801 to the media access drive unit 804.

The data storage controller unit 800 stores a data storage control program 806 to the inner main memory.

The recording media storage unit 801 stores one or more recording media cartridges 808 and 809.

Further, there is no change in the implementation of the present invention whether the data storage system 303 is changed to an optical disk library device, an HDD cartridge library device, a virtual tape library device other than the tape library device. Furthermore, a storage device which is connected to the outer side such as an c storage device and an NAS (Network Attached Storage) device may be employed.

In the above description, the configuration of the data storage system 303 has been described.

In addition, in the above configuration, the inner configuration of the components of the data processing system illustrated in FIG. 1 has been described.

Next, each DB table contained in the management database 306 will be described.

First, FIG. 7 is a diagram illustrating an example of the data storage list 900.

The data storage list (first management information) 900 contains, in a record, a data storage system ID 901, a port IP address 902, the kind of the storage system 903, the kind of the recording media 904, a data block size 906, a data transfer rate (Data Transfer Rate for the Media) 907, and a default number of storage nodes deployed 908.

Further, a performance parameter 905 is not defined for the column, but indicates that the data block size 906, the data transfer rate 907, and the default number 908 of storage nodes deployed are parameters related to the data storage system.

The data storage system ID 901 is a column which stores a value of identification information to specify the data storage system 303. Even in a case where a plurality of data storage systems 303 are connected to the node pool system 302, a non-overlapping number such as a serial number and address information or a character string is stored for distinction. In this embodiment, an example employing the serial number will be described.

The port IP address 902 stores a destination address of the data storage system 303. In this embodiment, a set of an IP address and a port number is stored. Further, as the information indicating the destination, information corresponding to the other URI (Uniform Resource Identifier) of the IP address may be used.

The kind of the storage system 903 is a column to store the information indicating the kind of the data storage system 303. As the information indicating the kind, there may be set values to distinguish the kind of the device such as a tape library, an optical disk library, and an virtual tape library.

The kind of the recording media 904 is a column to store the kind information of the recording media. There are kinds of the recording media according to the kinds of the data storage system 303, and values to distinguish the recording media may be defined in advance. For example, in a case where the kind of the storage system 903 is a tape library, there are kinds of the recording media such as LTO5, LTO6, and LTO7. In addition, in the case of the optical disk library, there are kinds of the recording media such as DVD, Blu-ray, and AD (Archival Disc). The information to distinguish these kinds is stored.

The data block size 906 stores a value of a size of the data which is a unit when the recording media is accessed.

The data transfer rate 907 stores the value of a data transfer speed (request performance) which is requested. The values of the data block size 906 and the data transfer rate 907 may be catalogue values, or may be set in advance.

The default number 908 of storage nodes deployed stores default values (initial values) of the file storage nodes 310 and 311 which are necessary for the cluster 308. The initial value is a predetermined value indicating the number of the file storage nodes 310 to be deployed in the node pool system 302.

In the above description, the configuration of the data storage list 900 to be stored in the management database 306 has been described.

FIG. 8 is a diagram illustrating an example of the configuration of the node pool list 1000. The node pool list 1000 stores, in one record, a node pool ID 1001, a management port IP address 1002, a user ID 1003, and a password 1005.

Authentication Information for the management port 1004 indicates that the user ID 1003 and the password 1005 are parameter related to the authentication.

The node pool ID 1001 is identification information to specify one or more physical servers 401, 402, and 403 which are included in the node pool system 302, and may be a non-overlapping number such as a serial number or a character string corresponding to the URI (Uniform Resource Identifier). In this embodiment, an example of the serial number will be described.

The management port IP address 1002 stores a value of the destination address to communicate with the container platform program 425 which is performed in the physical servers 401, 402, and 403. As the value, a character string corresponding to the URL may be used in addition to a set of the IP address and the port number. In this embodiment, a set of the IP address and the port number will be described.

The user ID 1003 stores a character string indicating user's identification information used in the authentication which is necessary to communicate with the container platform program 425.

The password 1005 stores a character string indicating the password used in the authentication which is necessary to communicate with the container platform program 425. Further, the password information may be encrypted in association to security.

In the above description, the configuration of the node pool list 1000 has been described.

FIG. 9 is a diagram illustrating an example of the configuration of the data buffer list 1100. The data buffer list 1100 stores, in one record, a data buffer ID 1101, access path information 1102, a handler node ID (NODE ID of Handler Node) 1103, a storage node ID (Node ID of Storage Node) 1104, a status 1105, and a creation date 1106.

The data buffer ID 1101 is identification information to distinguish the data buffer which is realized as the cluster 308, and may be a non-overlapping number such as a serial number or a character string corresponding to the URL. In this embodiment, an example of the serial number will be described.

The access path information 1102 stores the address information to be connected to the data buffer. As the address information, a character string corresponding to the URI may be used in addition to the IP address and the port number. In this embodiment, a set of the IP address and the port number will be described for example. In addition, a value in a case where the address information is not determined, a blank is set.

The handler node ID 1103 stores a value of an identifier of the handler node 424 to deploy the data buffer. Further, the identifier is identification information to specify a container, and is managed by the node list 1300 as described below.

The storage node ID 1104 stores an identifier of the file storage node which forms the data buffer. In this embodiment, in a case where one data buffer is configured by a plurality of file storage nodes, a plurality of identifiers are registered in one file.

The status 1105 stores the status information of the data buffer. In this embodiment, in-operation is denoted as the value "Active", a deleted data buffer is denoted as the value "Deleted", and the registered information is not deleted.

The creation date 1106 stores date information indicating a date when the data buffer is generated. The status 1105 may be used to collectively delete the "Deleted" records on the basis of the creation date 1106.

In the above description, the configuration of the data buffer list 1100 has been described.

FIG. 10 is a diagram illustrating an example of the configuration of the linkage node list 1200. The linkage node list 1120 stores, in one record, a linkage node ID (Column Node ID of Linkage Node) 1201, a data processing node ID (Node ID of Data Processing Node) 1202, a data storage system ID 1203, a data buffer ID 1204, a correction factor 1205, a status 1206, and a creation date 1207.

The linkage node ID 1201 stores an identifier to specify one or more linkage nodes 312. The data processing node ID 1202 stores an identifier of the data processing node 307 which uses the linkage node 312.

The data storage system ID 1203 stores identification information of the data storage system 303 which is connected to the linkage node 312. The data buffer ID 1204 stores identification information of the data buffer which is connected to the linkage node 312.

The correction factor 1205 stores a ratio to be corrected from a data buffer (initial value) in sizing when the data buffer is deployed. In this case, a value obtained as a result of correcting the default value may be stored. The sizing in this embodiment indicates the number of the file storage nodes 310 and 311 which form the data buffer.

In addition, in this embodiment, the number of increased/decreased nodes is calculated on the basis of the correction factor 1205, and the number of increased/decreased nodes is added to the default value to determine the number of nodes. Therefore, the correction factor 1205 is a value related to the number of increased/decreased nodes. In addition, the correction factor 1205 is recorded in the linkage node list 1200 as a history in association to the data storage system ID 1203. Therefore, the linkage node list 1200 can record the plurality of correction factors 1205 as a history with respect to one data storage system ID 1203.

The status 1206 stores the status information of the linkage node 312. If the linkage node 312 operates, the value "Active" is set to the status information. If the linkage node 312 is deleted, the value "Deleted" is stored. Even if the linkage node 312 is deleted, the data registered in the linkage node list 1120 is not deleted. The creation date 1207 stores the date information indicating a date where the linkage node 312 is performed.

In the above description, the configuration of the linkage node list 1120 has been described.

FIG. 11 is a diagram illustrating an example of the configuration of the node list 1300. The node list 1300 stores, in one record, a node ID 1301, a node type (Kind of Node) 1302, a node pool ID 1304, a status 1305, and a creation date 1306.

The node ID 1301 is identification information of a node (container) in which a non-overlapping number such as a serial number or a character string corresponding to the URI is stored. In this embodiment, an example of the serial number will be described.

The node type 1302 stores type information of a node. In this embodiment, the description will be particularly given about four types in which a value indicating the type of the data processing node is set to "Data Processing Node", a value indicating the handler node is set to "Handler Node", a value indicating the file storage node is set to "Storage Node", and a value indicating the linkage node is set to "Linkage Node".

The node pool ID 1304 stores the identification information of the node pool (physical server) where the node (container) is performed. The status 1305 stores the status information of a node. In a case where a node operates, the value "Active" is stored. In a case where a node is deleted, the value "Deleted" is stored. At the time when a node is deleted, there is no deletion from the node list 1300.

The creation date 1306 stores the date information indicating a date when a node is performed. In the above description, the configuration of the node list 1300 has been described.

Figure 12:
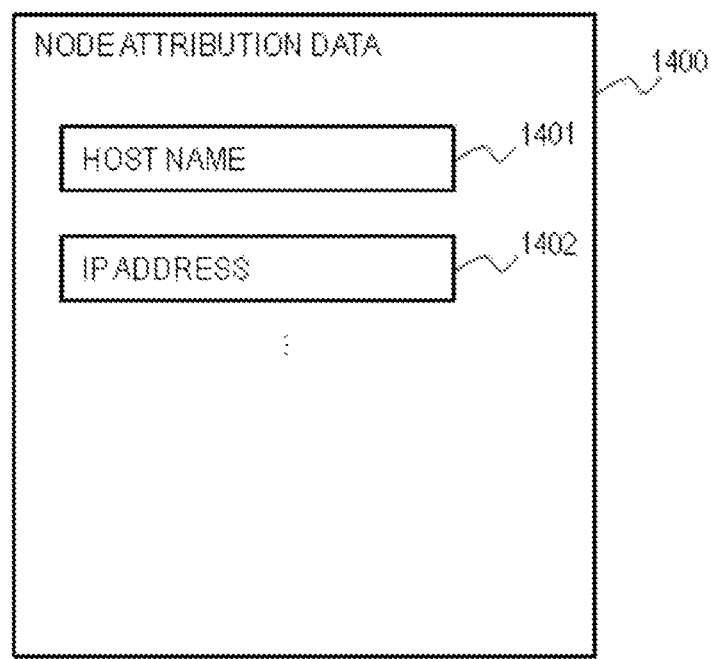
FIG. 12 is a diagram illustrating an example of node attribution data according to an embodiment of the invention.

FIG. 12 is a diagram illustrating an example of the configuration of node attribution data 1400.

The node attribution data 1400 stores a host name 1401 and an IP address 1402.

The container platform program 425 automatically assigns the host name and the IP address without overlapping in order to identify and manage the node at the time when a node (container) is performed. The container platform program 425 sets the assignment result to the node attribution data 1400. In the above description, the configuration of the node attribution data 1400 has been described.

Using FIGS. 13 and 14, the description will be given about an example of a screen layout 1500 which is displayed in a display 707 of the operation terminal 304 at the time when the data processing node program 508 operates.

Figure 13:
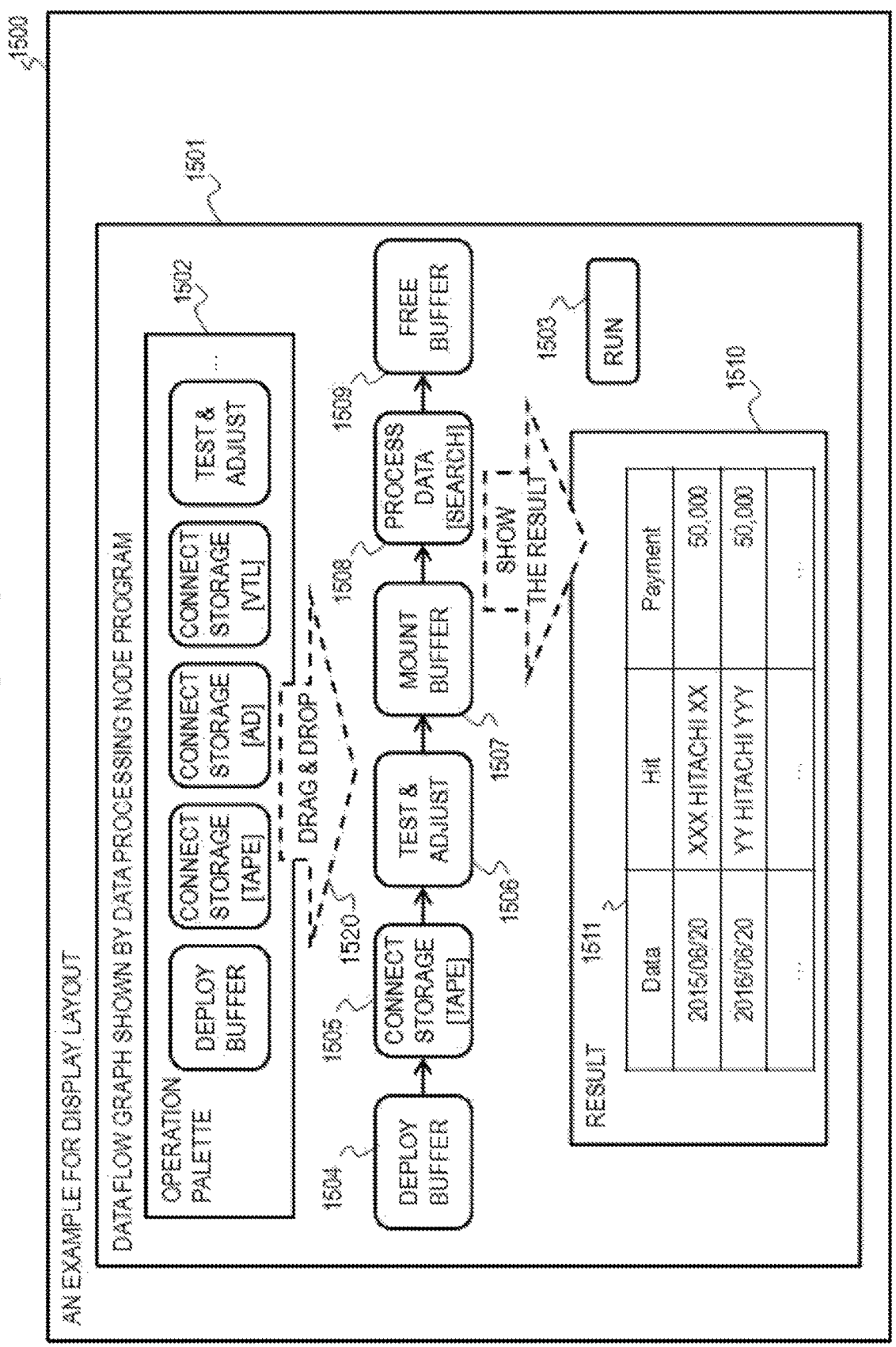
FIG. 13 is a diagram illustrating an example of a screen which is output by a data processing node program according to an embodiment of the invention.

FIG. 13 is a diagram illustrating an example of a screen which is output by the data processing node program 508. The screen layout 1500 includes a data flow displaying region 1501. The data flow displaying region 1501 includes an operation palette displaying region 1502, one or more operation icon images 1504, 1505, 1506, 1507, 1508, and 1509, an arrow connection which indicates some or all the connections of the operation icon image, a display region 1510 of a data processing result, and a run button image 1503.

The operation palette displaying region 1502 stores one or more operation icon images 1504 to 1509. The user disposes one or more operation icon images displayed in the operation palette displaying region 1502 toward the data flow displaying region 1501 through a drag & drop operation 1520, and connects the images with arrows to set an operation order, and inputs data flow.

An example of inputting the data flow is an image in which the operation icon images 1504, 1505, 1506, 1507, 1508, and 1509 are connected with arrows as illustrated in the drawing. In this embodiment, a process of these seven operation icon images will be described as an example.

The operation icon images 1504, 1505, 1506, 1507, 1508, and 1509 are connected with arrows in the data flow displaying region 1501. Such connection indicates that a process corresponding to the displayed contents of the operation icon images 1504 to 1509 is performed in the connection order of the operation icon images. Further, the process starts by operating the run button image 1503.

The operation icon image 1504 corresponds to a deploy operation of the data buffer (the cluster 308). The operation icon image 1505 corresponds to an operation to connect the data storage system 303 to the data buffer. The operation icon image 1506 corresponds to an operation to measure the performance and resize the data buffer with respect to the connection between the data buffer and the data storage system 303.

The operation icon image 1507 corresponds to an operation to connect the data processing node 307 and the data buffer. The operation icon image 1508 corresponds to an operation to perform the data processing in the data processing node 307. The operation icon image 1509 corresponds to an operation to delete the data buffer.

Figure 14:
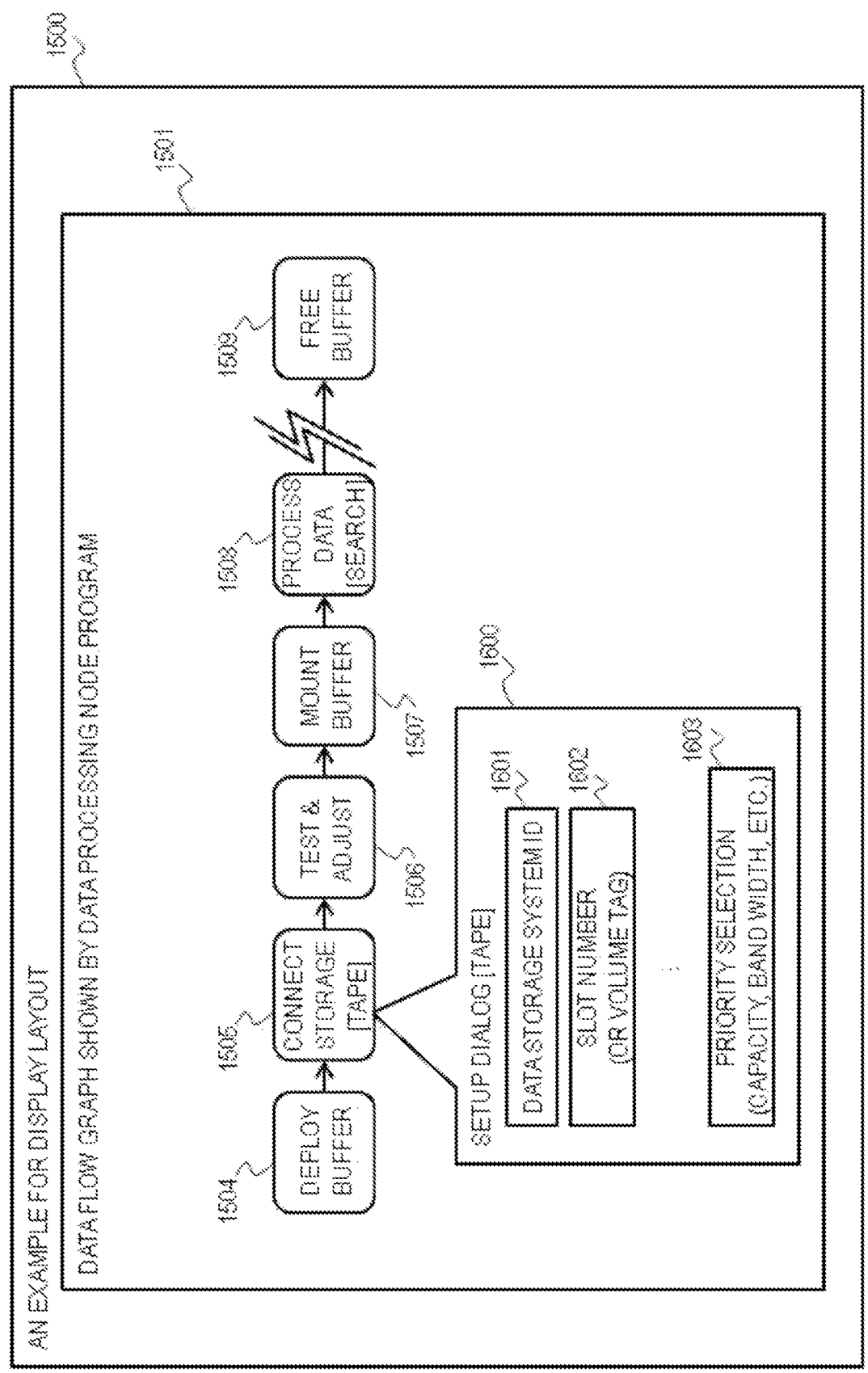
FIG. 14 is a diagram illustrating an example of a setting screen which is output by the data processing node program according to an embodiment of the invention.

FIG. 14 is a diagram illustrating an example of a setting screen which outputs the data processing node program 508. In the operation icon image 1505, a setting dialogue 1600 for setting the data storage system of the connection destination is displayed using the pointing device 709.

The setting dialogue 1600 includes a region 1601 to input and display the identification information (which may be information to specify a connection destination) of the data storage system 303, a region 1602 to input and display position information (or the identification information of a recording media such as volume tag) to specify a recording media stored in the library device, and a region 1603 to input and display a priority item related to the deploy of the data buffer.

Further, the display region 1603 indicates a priority of the performance required for the cluster 308 as a data buffer. For example, a case where the capacity is considered in priority or a case where a bandwidth (transfer speed) is considered in priority may be designated.

When the run button image 1503 illustrated in FIG. 13 is clicked by the pointing device 709, the data processing node 307 performs the operation displayed in a graph of the data flow in a displayed order.

When the operation corresponding to the operation icon image 1508 is performed, a table 1511 is displayed in the display region 1510 of the data processing result as an exemplary display of the data processing result.

In the above description, the inner configuration of the components of the data processing system will be described.

Next, the processing of the components will be described using a flowchart.

First, the process performed by the data storage management system 301 will be described using FIGS. 15 to 20.

Figure 15:
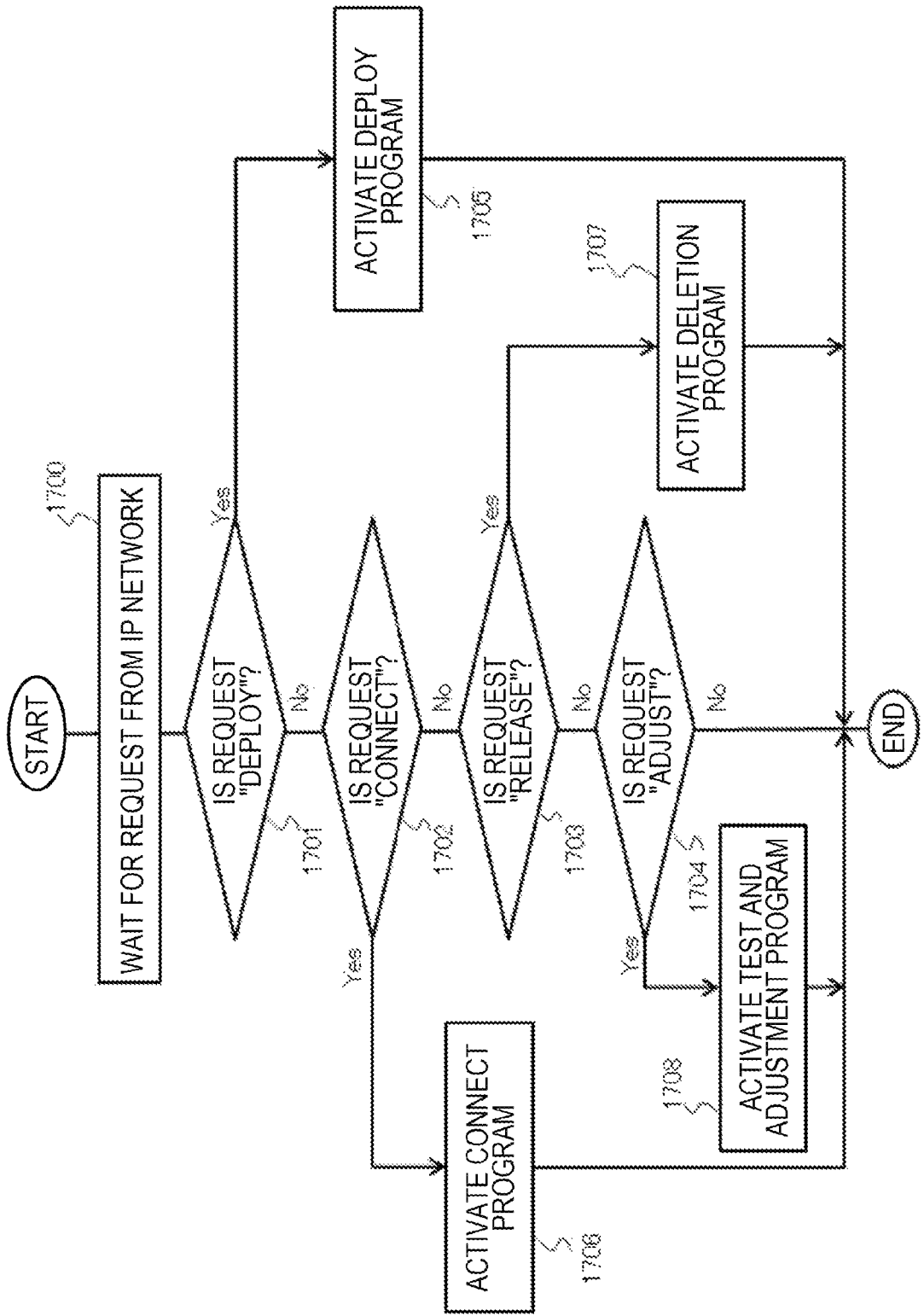
FIG. 15 is a flowchart illustrating an example of a process of a dispatch program according to an embodiment of the invention.

FIG. 15 is a flowchart illustrating an example of the process performed by the dispatch program 605.

The dispatch program 605 starts the following process to receive a request from the network 305. Further, in the following, the data storage management system 301 performing the dispatch program 605 is described as a subject of the process.

The data storage management system 301 receives a deploy request, a connection request, an adjust request, and a release request of the cluster 308 from the node pool system 302. The node pool system 302 issues the request on the basis of the data flow which is generated by the screen layout 1500 of the operation terminal 304.

In Step 1700, the data storage management system 301 waits for receiving a request through the network 305. Further, a transmission destination address of the request to the data storage management system 301 through the network 305 is a well-known address in the data processing system 300.

In Step 1701, the data storage management system 301 determines whether the received request is the "Deploy" of the cluster 308. If the request is the "Deploy," Step 1705 is performed. If the request is the "Deploy", Step 1702 is performed.

In Step 1702, the data storage management system 301 determines whether the received request is the "Connect" of the cluster 308. If the request is the "Connect", Step 1706 is performed. If the request is not the "Connect", Step 1703 is performed.

In Step 1703, the data storage management system 301 determines whether the received request is the "Release" of the cluster 308. If the request is the "Release", step 1707 is performed. If the request is not the "Release", Step 1704 is performed.

In Step 1704, the data storage management system 301 determines whether the received request is the "Adjust" of the cluster 308. If the request is the "Adjust", Step 1708 is performed. If the request is the "Adjust", the process ends.

In Step 1705, the data storage management system 301 ends after the deploy program 606 is performed. In Step 1706, the data storage management system 301 ends the connect program 607.

In Step 1707, the data storage management system 301 ends after the deletion program 609 is performed. In Step 1708, the data storage management system 301 ends the test and adjust program 608 is performed.

With the above process, the data storage management system 301 performs any one of the deploy program 606, the connect program 607, the test and adjust program 608, and the deletion program 609 according to the received request.

Figure 16:
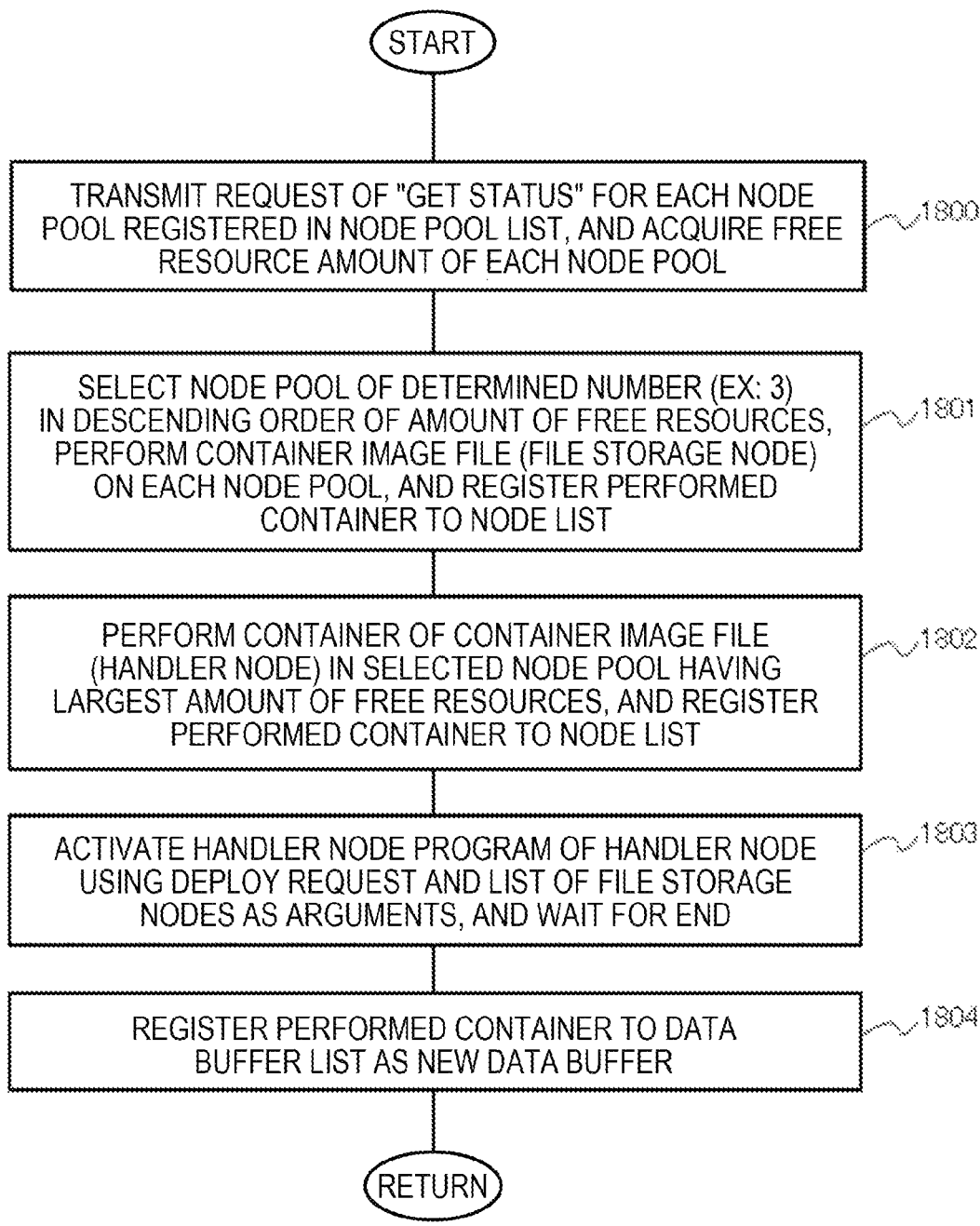
FIG. 16 is a flowchart illustrating an example of a process of a deploy program according to an embodiment of the invention.

FIG. 16 is a flowchart illustrating an example of the process of the deploy program 606. The deploy program 606 is a process performed in Step 1705 of FIG. 15.

In Step 1800, the data storage management system 301 transmits a request of "Get status" through a management port for every node pool (the physical servers 401 to 403) registered in the node pool list 1000 of the management database 306, and acquires a free resource amount of the node pool. For example, the free resource amount may include the empty capacity of the main memory 404 and the empty capacity of the HDD 410.

In Step 1801, the data storage management system 301 selects a predetermined number (for example, "3") of node pools in a descending order of the amount of free resources. The data storage management system 301 designates the container image file (File Storage Node) 502 stored in each HDD 410 with respect to the selected node pool (the physical servers 401 to 403), and performs the file storage nodes 310, 311, and 432.

The data storage management system 301 registers the performed file storage nodes 310, 311, and 432 to the node list 1300 of the management database 306.

In Step 1802, the data storage management system 301 designates the container image file (Handler Node) 501 stored in the HDD 410 in the node pool having a largest amount of free resources among the node pools selected in Step 1801, and performs the handler node 309. The data storage management system 301 registers the information of the performed handler node 309 to the node list 1300.

In Step 1803, the data storage management system 301 causes the handler node 309 to activate the handler node program 509 using the deploy request and the identification information of the file storage node as arguments, and waits for the end of the process.

In Step 1804, the data storage management system 301 registers a new data buffer (the cluster 308) to the data buffer list 1100 of the management database 306 from the identification information of the performed handler node 309 and the file storage nodes 310 and 311, and returns to a calling source.

With the above process, the data storage management system 301 received the deploy request activates the handler node 309 and the file storage nodes 310 and 311 in the node pool (the physical servers 401 to 403) of the node pool system 302.

Figure 17:
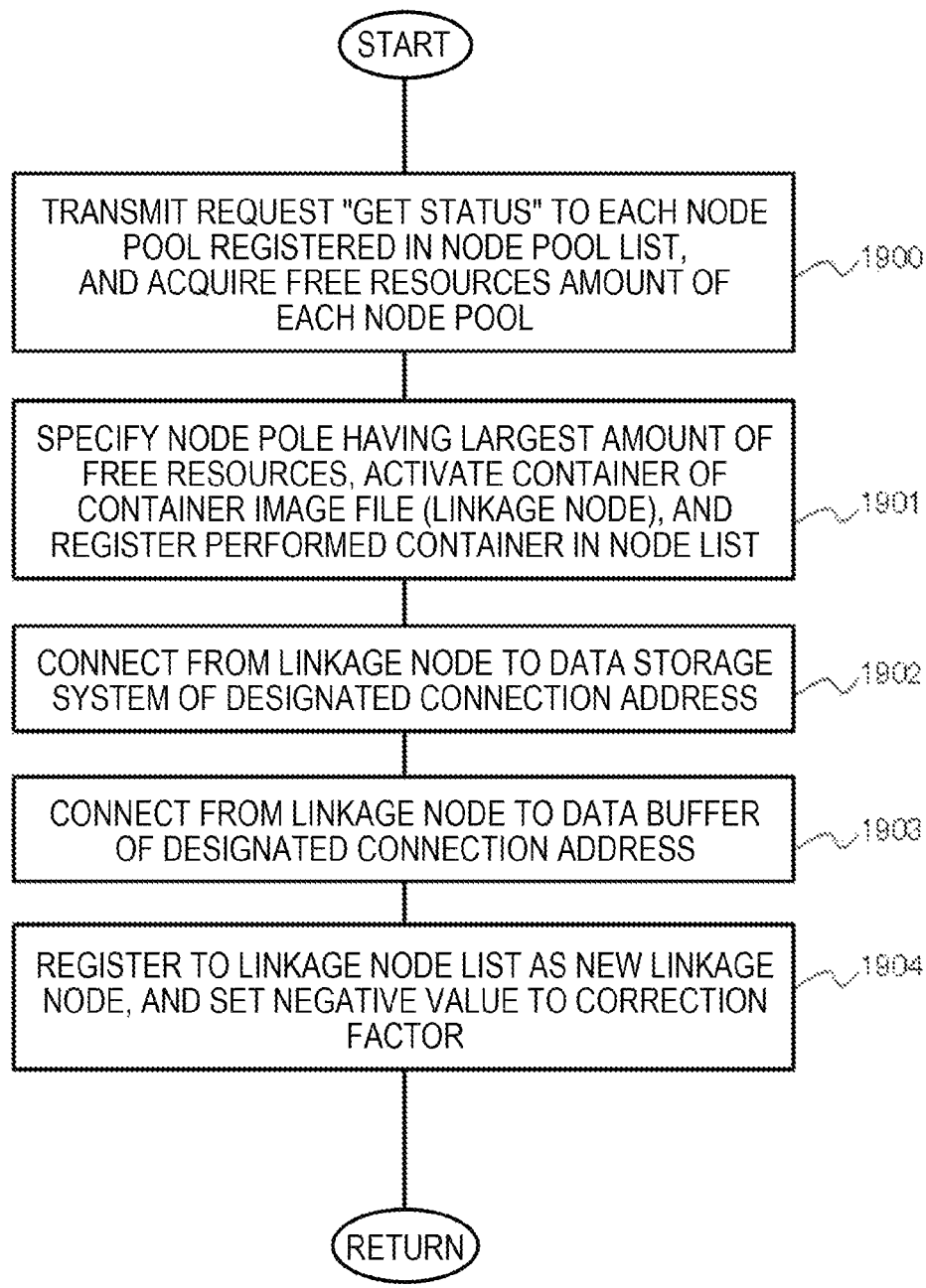
FIG. 17 is a flowchart illustrating an example of a process of a connect program according to an embodiment of the invention.

Next, FIG. 17 is a flowchart illustrating an example of the process performed in the connect program 607. The connect program 607 is a process which is performed in Step 1706 of FIG. 15.

In Step 1900, the data storage management system 301 transmits a request of "Get status" through the management port IP address 1002 for every node pool registered in the node pool list 1000 of the management database 306, and acquires a free resource amount of the node pool.

In Step 1901, the data storage management system 301 designates a node pool having a largest amount of free resources, designates the container image file (Linkage Node) 503 to the node pool, and activates the linkage node. The data storage management system 301 registers the activated node pool to the node list 1300.

In Step 1902, the data storage management system 301 is connected from the linkage node 312 to the data storage system 303 of the connection address which is designated by the connection request.

In Step 1903, the data storage management system 301 is connected from the linkage node 312 to the data buffer (the cluster 308) of the connection address which is designated by the connection request.

In Step 1904, the data storage management system 301 registers a new linkage node 312 to the linkage node list (second management information) 1200. The data storage management system 301 sets a predetermined negative value (for example, "−1") indicating that the measurement of the performance is not performed in the correction factor 1205 of the linkage node list 1200.

When the above process is completed, the process returns to the calling source. With this above process, the linkage node 312 is activated, the cluster 308 and the data storage system 303 are connected as a data buffer which is designated by the connection request.

Figure 18:
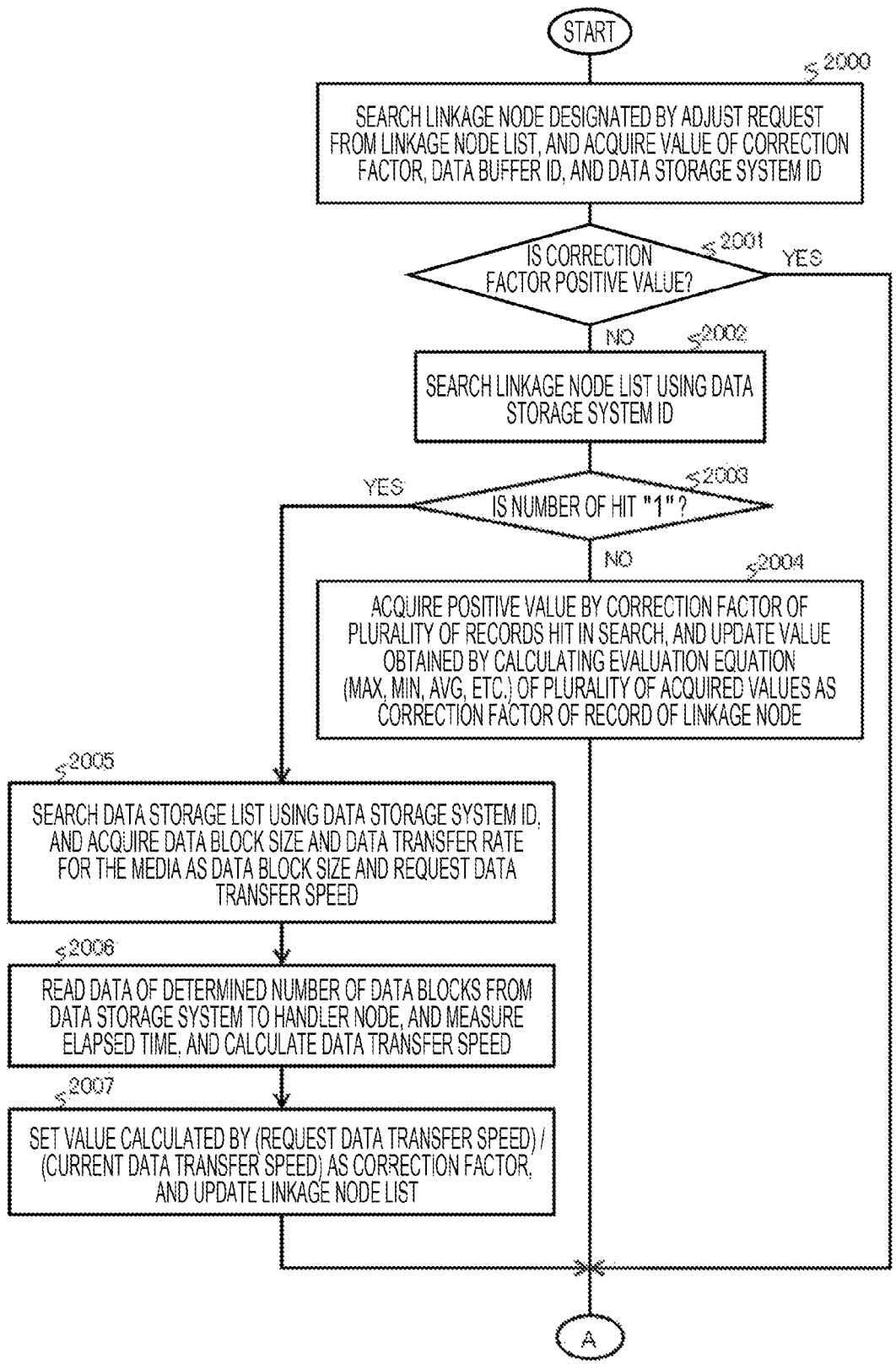
FIG. 18 is a flowchart illustrating the first half process of a test and adjust program according to an embodiment of the invention.
Figure 19:
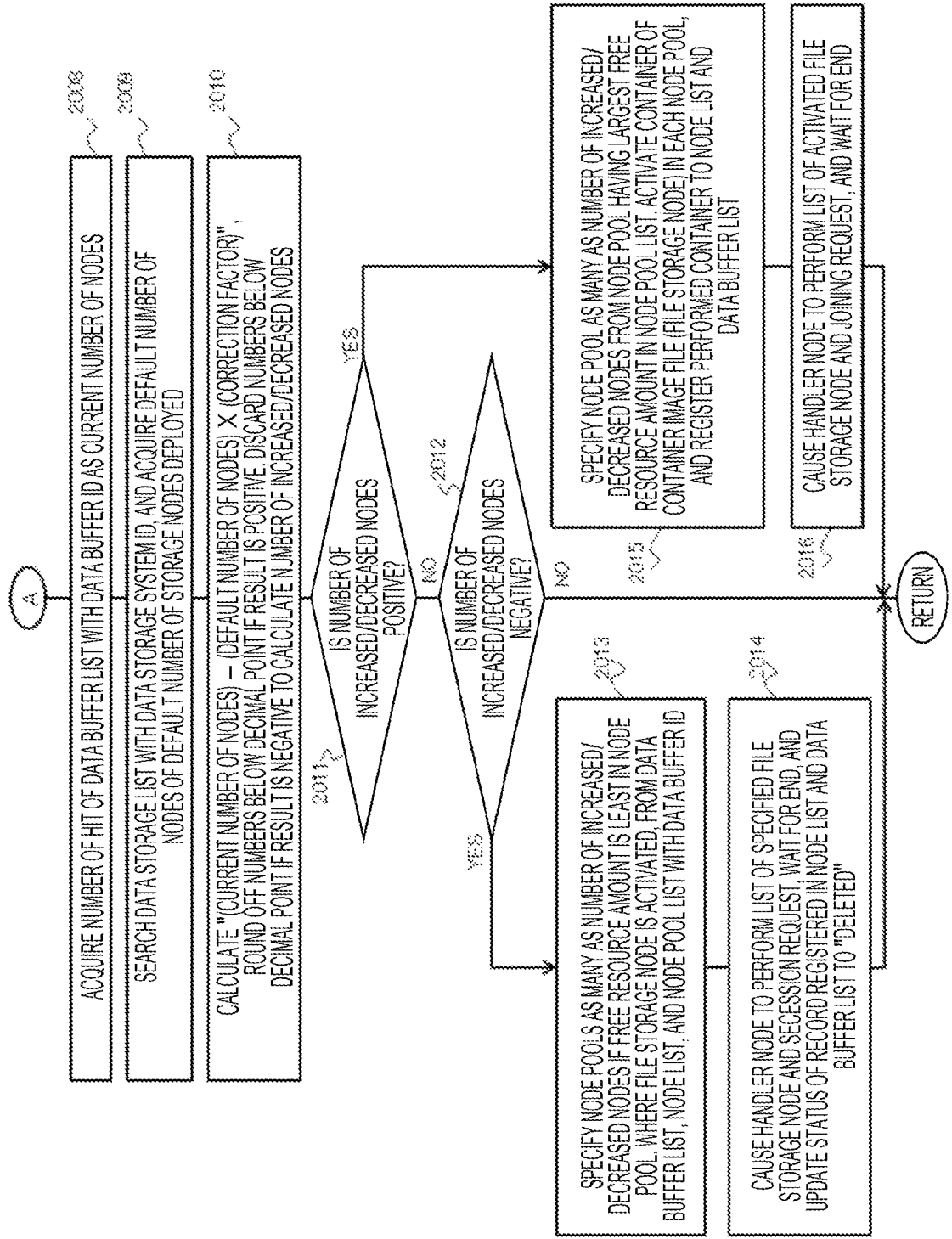
FIG. 19 is a flowchart illustrating the latter half process of the test and adjust program according to an embodiment of the invention.

With reference to FIGS. 18 and 19, the process of the test and adjust program 608 will be described. FIG. 18 is a flowchart illustrating the first half process of the test and adjust program 608. FIG. 19 is a flowchart illustrating the latter half process of the test and adjust program.

In Step 2000, the data storage management system 301 searches the linkage node 312 designated by the adjust request from the linkage node list 1200, and acquires the value of the correction factor 1205, the data buffer ID 1204, and the data storage system ID 1203.

In Step 2001, the data storage management system 301 determines whether the value of the acquired correction factor 1205 is positive. In a case where the value is positive, Step 2008 of FIG. 19 is performed. In a case where the value is not positive, Step 2002 is performed. In other words, the data storage management system 301 uses the correction factor which is already calculated if the value of the correction factor 1205 is positive.

In Step 2002, the data storage management system 301 searches the linkage node list 1200 using the data storage system ID 1203 which is acquired in Step 2000. Then, the data storage management system 301 calculates the number of records which are searched and hit.

Next, in Step 2003, the data storage management system 301 determines whether the number of hit results is "1". If the number of records matched to the data storage system ID 1203 is "1", the procedure proceeds to Step 2005. If the number of records is larger than "1", the procedure proceeds to Step 2004.

In a case where the number of records is "1", there is only the data storage system ID 1203 just recorded in the linkage node list 1200. Therefore, the data storage management system 301 newly calculates the correction factor.

On the other hand, in a case where the number of records is larger than "1", there are a past history of the data storage system 303 of the data storage system ID 1203 in the linkage node list 1200. Therefore, the data storage management system 301 uses the correction factor 1205 of the history.

In Step 2004, the data storage management system 301 acquires a positive value by the correction factor 1205 of the plurality of records searched in Step 2002. The data storage management system 301 is a value calculated from the plurality of acquired values using a predetermined evaluation equation (MAX, MIN, AVG, etc.), and is updated as the correction factor 1205 of the linkage node 312.

In this embodiment, the evaluation equation to calculate a maximum value (MAX) will be described. Further, a well-known or general statistics processing such as a minimum (MIN) and an average value (AVG) other than the maximum value may be employed as the evaluation equation. In addition, there may be employed a method by correlating a parameter to be acquired from the management database 306 with a parameter of the linkage node 312 registered in the past, and selecting a correction factor of the most similar linkage node.

In Step 2005, the data storage management system 301 searches the data storage list 900 using the data storage system ID 1203 which is acquired in Step 2000. The data storage management system 301 acquires the value of the data block size and the value of the request data transfer speed from the data block size 906 and the data transfer rate 907 in the record matched with the data storage system ID 901.

In Step 2006, the data storage management system 301 searches the data buffer list 1100 by the data buffer ID 1204 acquired in Step 2000, and acquires the handler node ID 1103 from the record matched with the data buffer ID 1101.

Then, the data storage management system 301 causes the handler node 309 specified with the handler node ID 1103 to read the data of a predetermined number of data blocks from the data storage system 303 and to measure an elapsed time, and calculates the current data transfer speed. Further, the predetermined number of data blocks is previously set with the number of data blocks in which a measurement error can be ignored.

In Step 2007, the data storage management system 301 calculates the correction factor by the following Expression (1).

$$\text{Correction Factor} = \text{Request Data Transfer Speed} / \text{Current Data Transfer Speed} \quad (1)$$

The data storage management system 301 updates the correction factor 1205 of the record of the linkage node list 1200 which is searched in Step 2000 with the calculated value.

In 2008 of FIG. 19, the data storage management system 301 searches the data buffer list 1100 with the data buffer ID 1204 which is acquired in Step 2000. Then, the data storage management system 301 acquires the number of records of which the status 1105 is "ACTIVE" as the current number of nodes among the searched results in which the data buffer ID 1101 is matched. The current number of nodes is the number of nodes of the cluster 308 which provides the data buffer.

In Step 2009, the data storage management system 301 searches the data storage list 900 with the data storage system ID 1203 acquired in Step 2000, and acquires the default number of nodes from the default number 908 of storage nodes deployed from the record in which the data storage system ID 901 is matched.

In Step 2010, the data storage management system 301 calculates the number of increased/decreased nodes by the following Expression (2).

$$(\text{Current Number of Nodes}) - (\text{Default Number of Nodes}) \times (\text{Correction Factor}) \quad (2)$$

The data storage management system 301 calculates the number of increased/decreased nodes by rounding off numbers below the decimal point if the calculation result is a positive value, or discarding the numbers below the decimal point if the calculation result is a negative value.

In Step 2011, the data storage management system 301 determines whether the number of increased/decreased nodes is a positive value. If the number of increased/decreased nodes is a positive value, Step 2015 is performed. If the number of increased/decreased nodes is not a positive value, Step 2012 is performed.

In Step 2012, the data storage management system 301 determines whether the number of increased/decreased nodes is a negative value. If the number of increased/decreased nodes is a negative value, Step 2013 is performed. If the number of increased/decreased nodes is not a negative value, the procedure returns to the calling source.

In Step 2013, the data storage management system 301 searches the data buffer list 1100 with the data buffer ID 1204 which is acquired in Step 2000, and specifies the storage node ID 1104. Then, the data storage management system 301 searches the node list 1300 with the storage node ID 1104 to acquire the node pool ID 1304.

The data storage management system 301 specifies the file storage node as many as the number of increased/decreased nodes from the node having the lowest free resource amount in the node pool which is processed by the specified file storage node.

In Step 2014, the data storage management system 301 transmits a list of the specified file storage nodes and a secession request to the handler node 309, and waits for the processing end of the handler node 309. The data storage management system 301 updates the statuses 1305 and 1105 of the records registered in the node list 1300 and the data buffer list 1100 corresponding to the specified file storage node with the value "Deleted", and returns to the calling source.

In Step 2015, the data storage management system 301 specifies the node pool as many as the number of increased/decreased nodes from the node having the most free resource amount in the node pool list 1000, and activates the file storage node of the container image file (File Storage Node) 502 in the node pool.

The data storage management system 301 registers the activated file storage node to the node list 1300 and the data buffer list 1100.

In Step 2016, the data storage management system 301 searches the data buffer list 1100 by the data buffer ID 1204 acquired in Step 2000, and acquires the handler node ID 1103 from the record matched with the data buffer ID 1101.

Then, the data storage management system 301 transmits a list of the activated file storage nodes and a joining request to the handler node 309 which is specified with the handler node ID 1103, and waits for the processing end of the handler node 309.

With the above process, in a case where the correction factor 1205 is not possible to be used from the past history, the data storage management system 301 causes the handler node 309 to measure the current data transfer speed, and calculates the correction factor from the current data transfer speed and the request data transfer speed which is previously set.

Then, the data storage management system 301 calculates the number of increased/decreased nodes from the number of current node pools, the default number 908 of storage nodes deployed, and the correction factor, and adjusts the number of file storage nodes of the current node pool.

Figure 20:
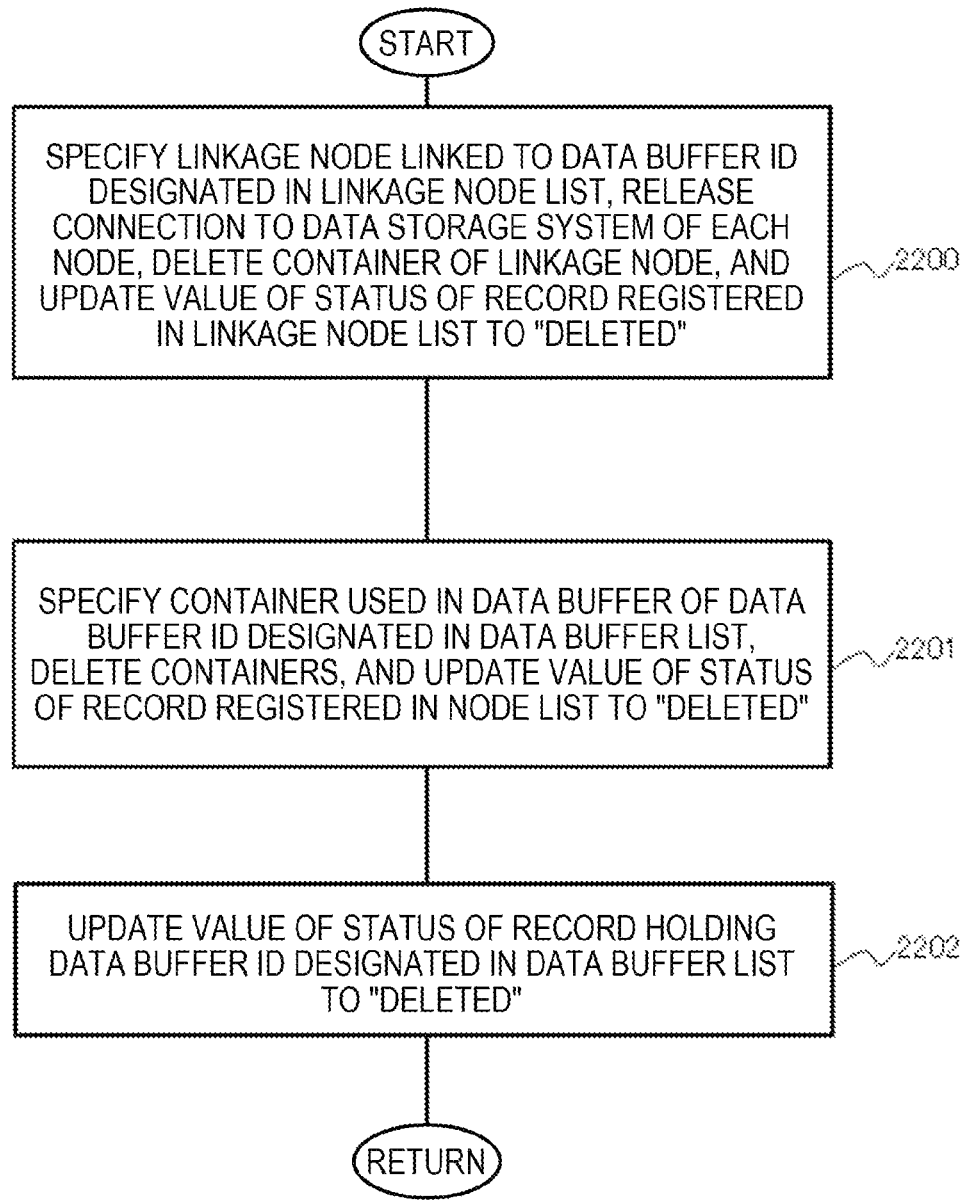
FIG. 20 is a flowchart illustrating the first half process of a deletion program according to an embodiment of the invention.

FIG. 20 is a flowchart illustrating an example of the process performed in the deletion program 609.

In Step 2200, the data storage management system 301 searches the linkage node list 1200 with the data buffer ID which is designated in a delete request, and specifies the linkage node 312 which is connected to the data buffer (the cluster 308).

The data storage management system 301 releases the connection between the specified linkage node 312 and the data storage system 303, and transmits the delete request of the linkage node 312 to the container platform program 425 of the node pool which is managed by the linkage node 312.

The data storage management system 301 updates the value of the status 1206 of the delete target record which is recorded in the linkage node list 1200 to "deleted".

In Step 2201, the data storage management system 301 searches the data buffer list 1100 in the data buffer list 1100 with the data buffer ID which is designated by the delete request, specifies nodes which forms the data buffer (the cluster 308), and transmits the delete request of these nodes to the container platform program 425 of the node pool which performs each node.

The data storage management system 301 updates the value of the status 1305 to "deleted" with respect to the delete target record which is recorded in the node list 1300.

In Step 2202, the data storage management system 301 updates the value of the status 1105 of the record of the data buffer list 1100 where the data buffer ID designated by the delete request is stored to "deleted", and returns to the calling source.

With the above process, as for the delete target data buffer (the cluster 308), the linkage node 312 is deleted to release the connection between the cluster 308 and the data storage system 303, and the container of the file storage nodes 310 and 311. The handler node 309 is deleted. Then, the status of the record corresponding to the management database 306 is set to "deleted", and stored as a history.

Figure 21:
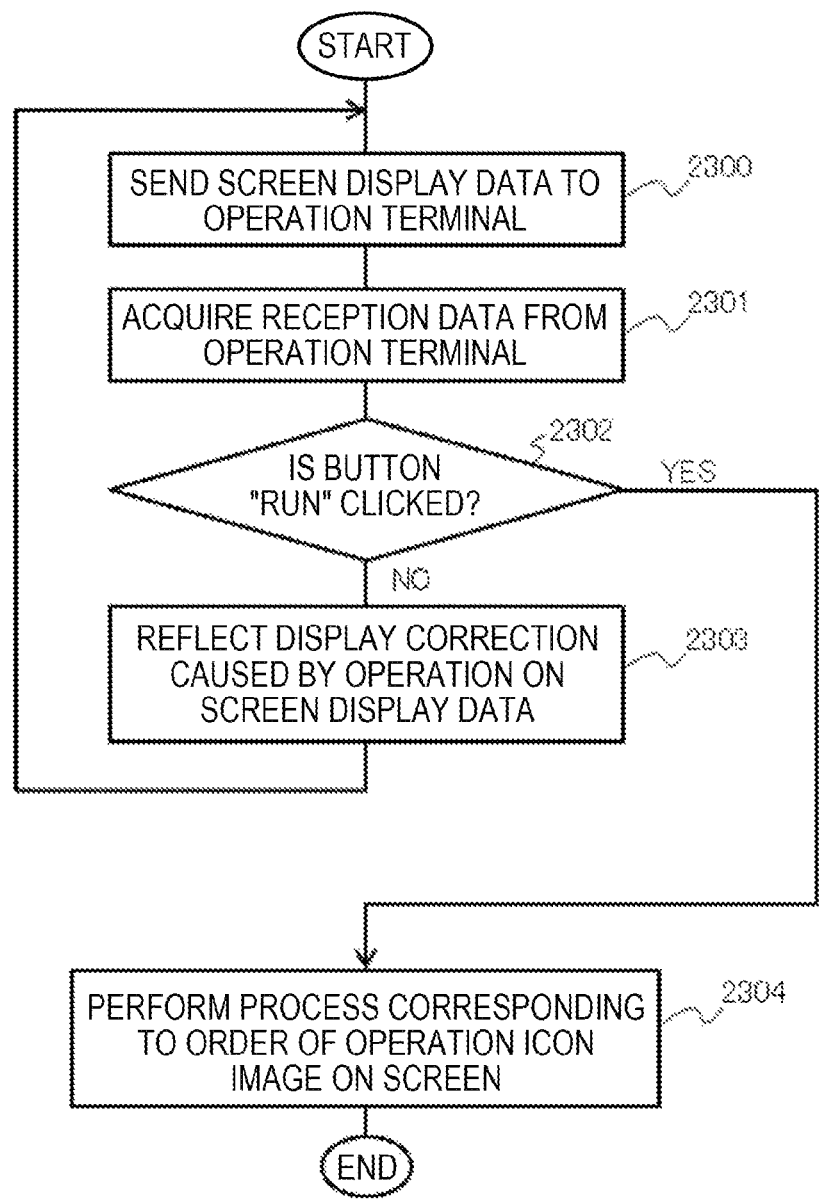
FIG. 21 is a flowchart illustrating an example of a process of the data processing node program according to an embodiment of the invention.

Next, FIG. 21 is a flowchart illustrating an example of the process performed by the data processing node program 508 which functions as the data processing node 307. Further, the description below will be given focusing on the process of the data processing node 307.

In Step 2300, the data processing node 307 generates the screen layout 1500 illustrated in FIG. 13, and transmits the screen display data to the operation terminal 304. Next, in Step 2301, the data processing node 307 acquires data from the operation terminal 304.

In Step 2302, the data processing node 307 determines whether the button "Run" 1503 in the screen layout 1500 is clicked. In a case where the button is clicked, Step 2304 is performed, and if not, Step 2303 is performed.

In Step 2303, the data processing node 307 reflects the display correction by an operation in the operation terminal 304 on the screen display data. Next, the procedure returns to Step 2300, and the above process is repeatedly performed.

In Step 2304, the data processing node 307 performs the corresponding processes on the order of the icons (the operation icon images 1504 to 1509) on the screen layout 1500. In the following, the operation icon images 1504 to 1509 illustrated in FIG. 13 will be described as an example of the process.

In correspondence with the first icon "Deploy Buffer" (the operation icon image 1504), the data processing node 307 transmits a request "Deploy" to the storage management system 301 to deploy the data buffer (the cluster 308), and acquires the access path information to the data buffer.

Next, in correspondence with the second icon "Connect Storage [Tape]" (the operation icon image 1505), the data processing node 307 transmits a request of "Connect" to the data storage management system 301. The data storage management system 301 causes the node pool system 302 to generate the linkage node 312 which connects the data buffer (the cluster 308) and the data storage system 303, and transfers the data of the data storage system 303 such as the recording media cartridge to the data buffer.

Next, in correspondence with the third icon "Test & Adjust" (the operation icon image 1506), the data processing node 307 transmits a request "Adjust" to the storage management system 301. The data storage management system 301 adjusts the number of the file storage nodes 310 and 311 which form the data buffer to the node pool system 302.

Next, in correspondence with the fourth icon "Mount Buffer" (the operation icon image 1507), the data processing node 307 performs a process to be connected to an access path (the linkage node 312) which is acquired as a result of performing the first icon "Deploy Buffer" (the operation icon image 1504).

Next, in correspondence with the fifth icon "Process Data [Search]" (the operation icon image 1508), the data processing node 307 searches data on the data buffer, and displays a table 1511 of the searching result in the display region 1510 of the operation terminal 304.

Next, in correspondence with the sixth icon "Free Buffer" (the operation icon image 1509), the data processing node 307 transmits a request "Release" to the storage management system 301 to release the resource secured until now by the node pool system 302, and ends the series of processes.

In this way, the data processing node 307 can perform the process designated by the operation terminal 304 using the cluster 308 generated in the node pool system 302 by the data storage management system 301 as a data buffer.

Figure 22:
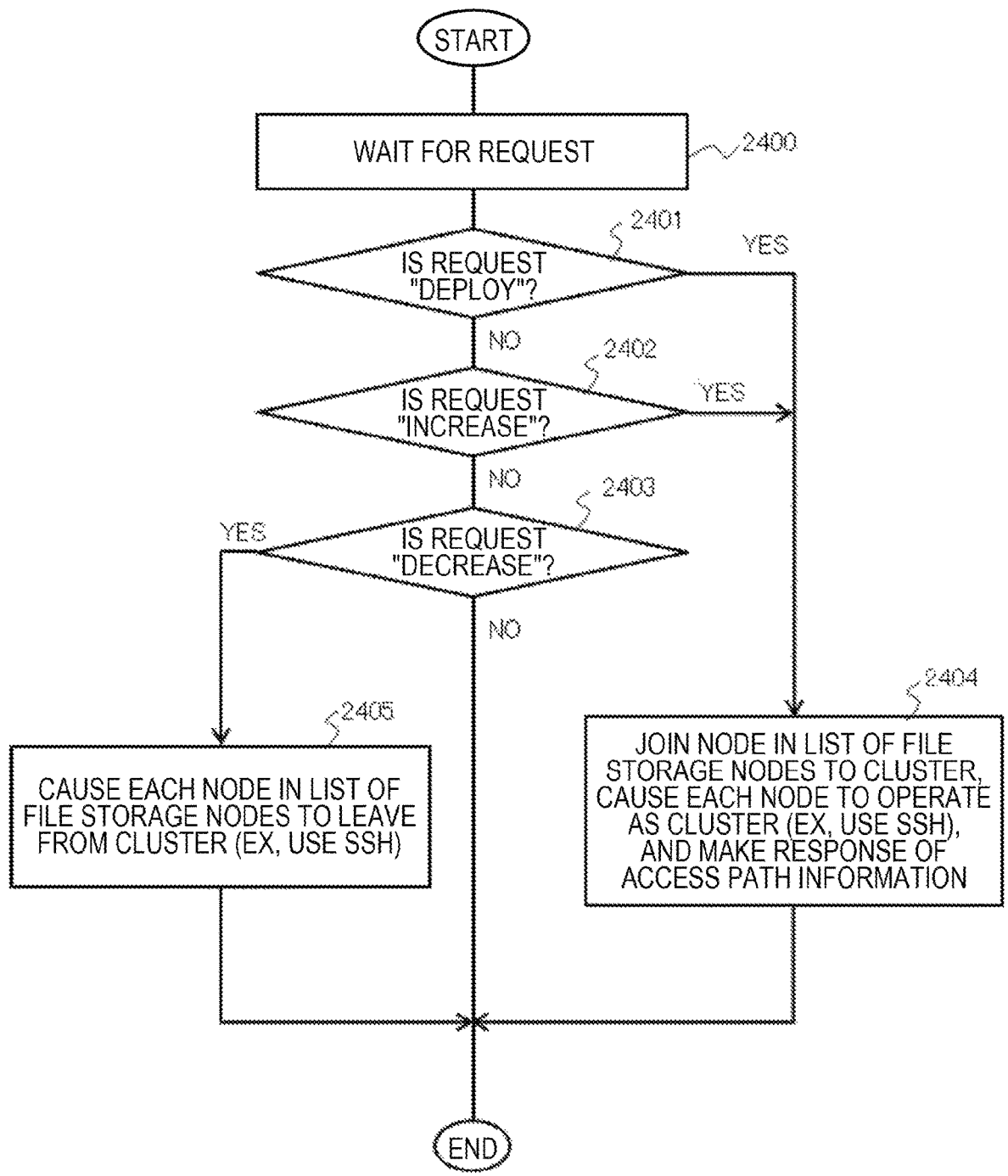
FIG. 22 is a flowchart illustrating an example of a process of a handler node program according to an embodiment of the invention.

FIG. 22 is a flowchart illustrating an example of the process of the handler node program 509 which functions as the handler node 309. Further, the description below will be given focusing on the process of the handler node 309.

In Step 2400, the handler node 309 waits for a request. The handler node 309 performs the following process when the request is received.

In Step 2401, the handler node 309 determines whether the received request is "Deploy". If the request is "Deploy", Step 2404 is performed. If the request is not "Deploy", Step 2402 is performed.

Further, for example, the deploy request is transmitted by the data storage management system 301 as illustrated in Step 1803 of FIG. 16. The identification information (list) of the deploy target file storage node is included.

In Step 2402, the handler node 309 determines whether the received request is "Increase". If the request is "Increase", Step 2404 is performed. If the request is not "Increase", Step 2403 is performed.

Further, for example, the increase request is transmitted by the data storage management system 301. The identification information (list) of the increase target file storage node is included.

In Step 2403, the handler node 309 determines whether the received request is "Decrease". If the request is "Decrease", Step 2405 is performed. If the request is not "Decrease", the process ends.

Further, for example, the decrease request is transmitted by the data storage management system 301. The identification information (list) of the decrease target file storage node is included.

In Step 2404, the handler node 309 joins various nodes included in the list of the file storage node designated by the received request to the cluster 308, and causes each node to function as the cluster 308. The handler node 309 operates each node using a remote operation command such as ssh (Secure Shell). The handler node 309 ends the process in response to the request source of the access path information to the cluster 308.

In Step 2405, the handler node 309 ends the process of causing each node included in the list of the file storage node to leave from the cluster 308.

In this way, the handler node 309 controls each node which is performed as a container by transmitting various requests received from the data storage management system 301 to the processing target node pool (the physical servers 401 to 403).

Figure 23:
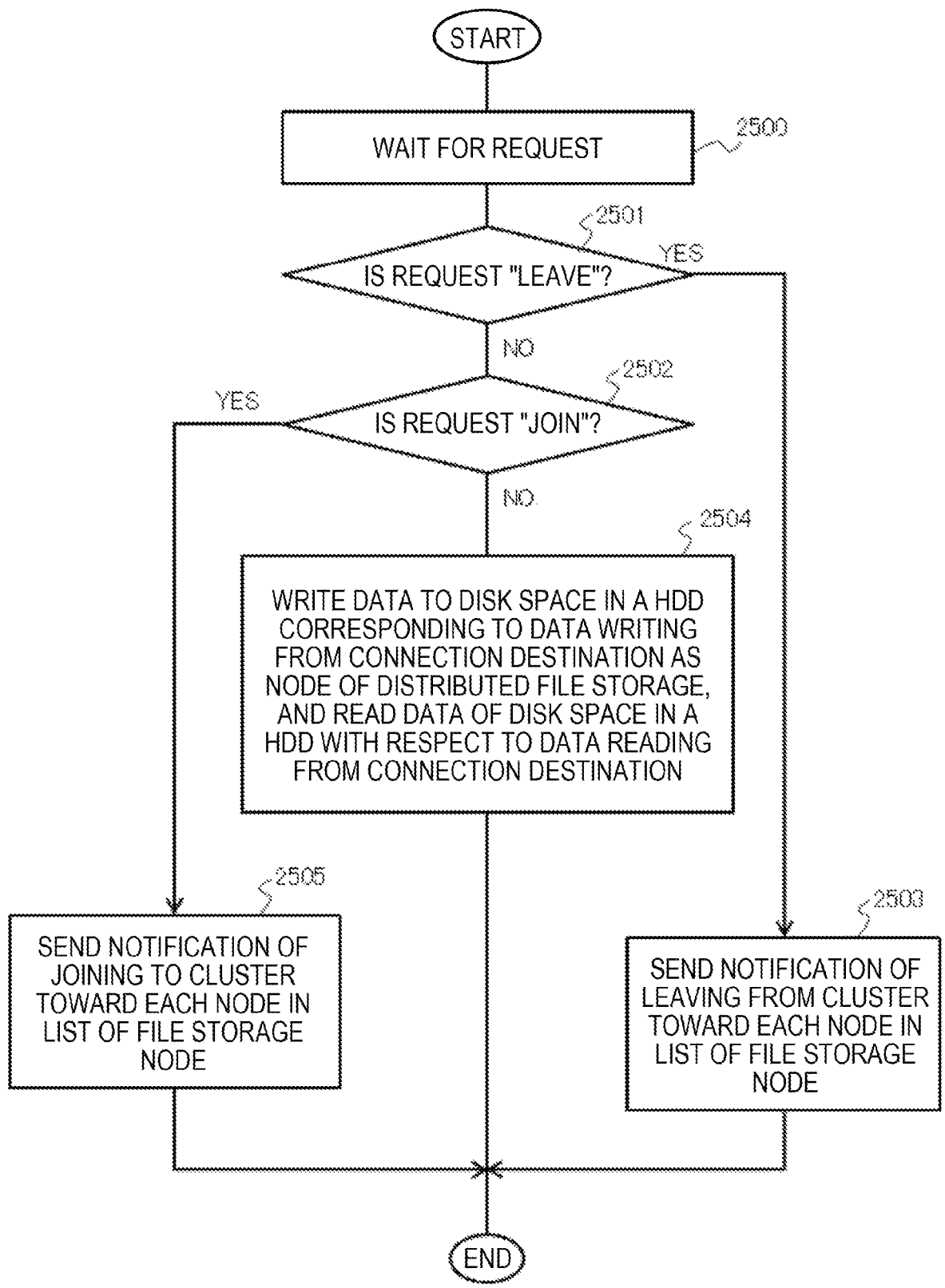
FIG. 23 is a flowchart illustrating an example of a process of a file storage node program according to an embodiment of the invention.

FIG. 23 is a flowchart illustrating an example of the process of the file storage node program 510 which functions as the file storage nodes 310, 311, and 432. Further, the description below will be given focusing on the process of the file storage node 310.

In Step 2500, the file storage node 310 waits for a request from the handler node 309. Next, Step 2501 is performed. In Step 2501, the file storage node 310 determines whether the received request is "Leave". If the request is "Leave", Step 2503 is performed. If the request is not "Leave", Step 2502 is performed.

In Step 2502, the file storage node 310 determines whether the received request is "Join". If the request is "Join", Step 2505 is performed. If the request is not "Join", Step 2504 is performed.

In Step 2503, the file storage node 310 ends the process after a notification of leaving from the cluster 308 is transmitted to each node in the list of the file storage node which is added to the secession request.

In Step 2504, the file storage node 310 receives an access request as a node of the distributed file storage. In a case where the received content is neither the joining request nor the secession request, the file storage node 310 receives the access request with respect to the data storage system 303.

In a case where the access request is a data write, the file storage node 310 writes the data to the disk space (Disk Space for a container) 516. In a case where the access request is a data read, the file storage node 310 reads the data of the disk space 516. Further, the disk space 516 is connected to the data storage system 303 by the linkage node 312.

In Step 2505, the file storage node 310 ends the process after a notification of joining to the cluster 308 is transmitted to each node in the list of the file storage node which is added to the joining request.

Further, the secession request is received from the handler node 309 in Step 2014 illustrated in FIG. 19. The joining request is received from the handler node 309 in Step 2016 illustrated in FIG. 19.

As described above, the file storage node 310 performs an access to the disk space 516 with respect to the request other than the joining request and the secession request, and sends the access result to the request source in response.

Figure 24:
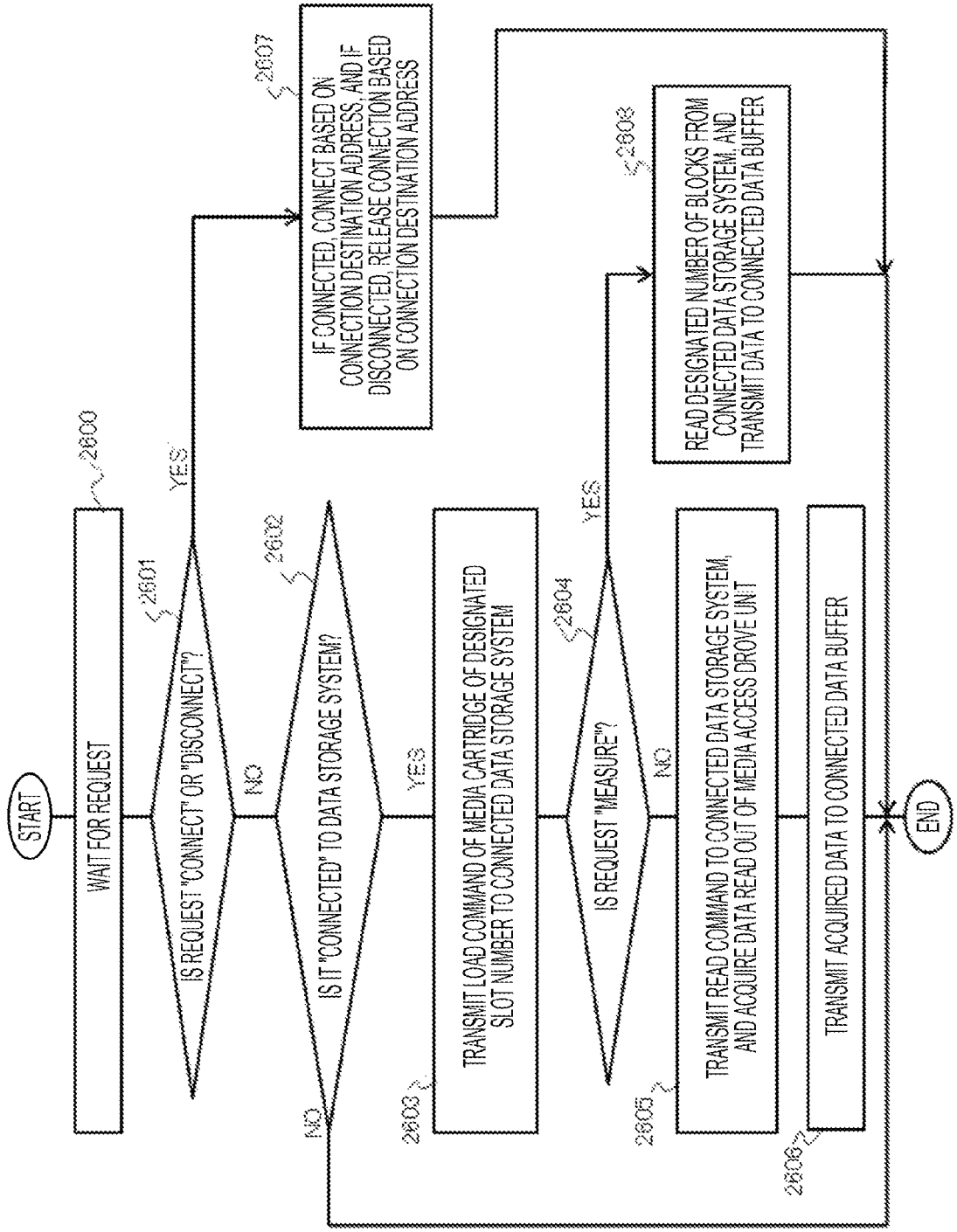
FIG. 24 is a flowchart illustrating an example of a process of a linkage node program according to an embodiment of the invention.

FIG. 24 is a flowchart illustrating an example of the process of the linkage node program 511 which functions as the linkage node 312. Further, the description below will be given focusing on the process of the linkage node 312.

In Step 2600, the linkage node 312 waits for a request. Next, in Step 2601, the linkage node 312 determines whether the received request is any one of "Connect" and "Disconnect". In a case where the linkage node 312 receives "Connect" or "Disconnect", Step 2607 is performed, and if not, Step 2602 is performed.

In Step 2602, the linkage node 312 determines whether the node is "Connected" to the data storage system 303. If the node is connected, Step 2603 is performed. If the node is not connected, the process ends.

In Step 2603, the linkage node 312 transmits a load command of the recording media cartridge of a slot number which is designated by the received request to the connected data storage system 303.

In Step 2604, the linkage node 312 determines whether the received request is "Measure". If the request is "Measure", Step 2608 is performed. If the request is not "Measure", Step 2605 is performed.

In Step 2605, the linkage node 312 transmits a read command to the connected data storage system 303, and acquires the data which is read out of the media access drive unit 804. Further, this embodiment is described about an example where the received access request is to read. In a case where the access request is to write, the linkage node 312 may transmit a write command to the connected data storage system 303.

In Step 2606, the linkage node 312 ends the process of transmitting the acquired data to the connected data buffer (the cluster 308).

In Step 2607, in a case where the received request is to connect, the linkage node 312 is connected on the basis of the connect destination address (for example, the port IP address 902 illustrated in FIG. 7) contained in the request. In a case where the received request is to disconnect, the connection to the connect destination address contained in the request is released to end the process.

In Step 2608, the linkage node 312 reads out the data by the predetermined number of data blocks from the connected data storage system 303 in order to measure the transfer speed, and transmits the data to the connected data buffer (the cluster 308). The linkage node 312 measures an elapsed time taken for completing the reading after starting the reading, and ends the process in response to the measurement result.

As described above, the linkage node 312 controls the connection to the data storage system 303 according to the connection request or the disconnection request. In the case of the measure request, the linkage node 312 measures a time taken for reading the predetermined data block amount, and performs an access to the data storage system 303 in the other access requests.

Figure 25:
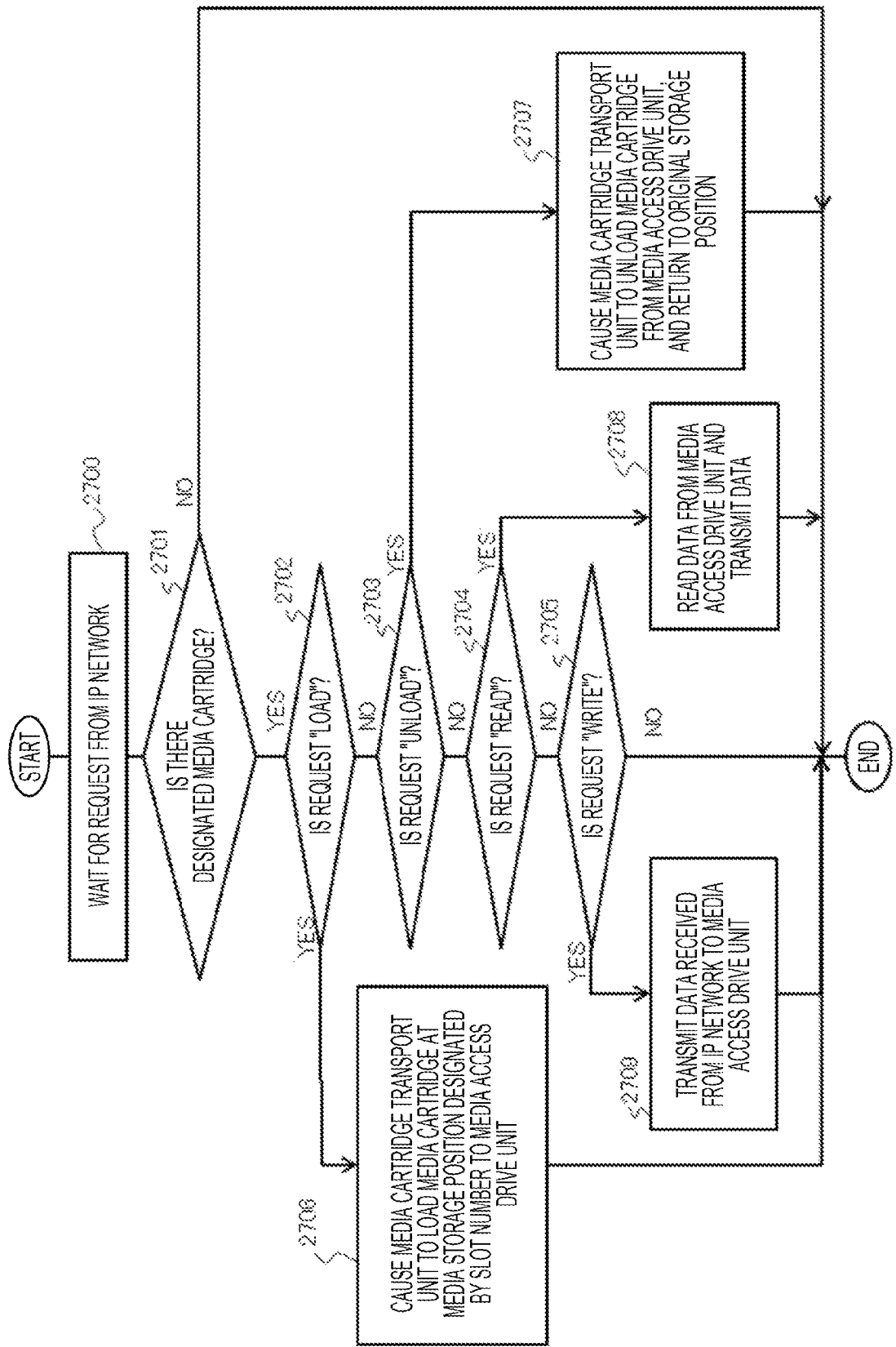
FIG. 25 is a flowchart illustrating an example of a process of a data storage control program according to an embodiment of the invention.

FIG. 25 is a flowchart illustrating an example of the process of the data storage control program 806 which operates in the data storage system 303. Further, the description below will be given focusing on the process of the data storage controller unit 800 which performs the data storage control program 806.

In Step 2700, the data storage controller unit 800 waits for a request from the network 305. Next, in Step 2701, the data storage controller unit 800 determines whether the recording media cartridge 808 of which the slot number is designated in the received request is stored in the recording media storage unit 801. If the recording media cartridge 808 is stored, Step 2702 is performed. If the recording media cartridge 808 is not stored, the process ends.

In Step 2702, the data storage controller unit 800 determines whether the received request is "Load". If the request is "Load", Step 2706 is performed. If the request is not "Load", Step 2703 is performed.

In Step 2703, the data storage controller unit 800 determines whether the received request is "Unload". If the request is "Unload", Step 2707 is performed. If the request is not "Unload", Step 2704 is performed.

In Step 2704, the data storage controller unit 800 determines whether the received request is "Read". If the request is "Read", Step 2708 is performed. If the request is not "Read", Step 2705 is performed.

In Step 2705, the data storage controller unit 800 determines whether the received request is "Write". If the request is "Write", Step 2709 is performed. If the request is not "Write", the process ends.

In Step 2706, the data storage controller unit 800 ends the process of loading the recording media cartridge 808 at a storage position of the recording media which is designated by the slot number assigned in the received request to the media access drive unit 804 by the media cartridge transport unit 803.

In Step 2707, the data storage controller unit 800 ends the process after the recording media cartridge 808 is unloaded from the media access drive unit 804 and returns to the original storage position by the media cartridge transport unit 803.

In Step 2708, the data storage controller unit 800 reads out the data from the media access drive unit 804, and transmits the data to the network 305.

In Step 2709, the data storage controller unit 800 ends the process after the data received from the network 305 is transmitted to the media access drive unit 804.

With the above process, the data storage controller unit 800 operates the recording media according to the received request, and performs the reading and writing.

Figure 26:
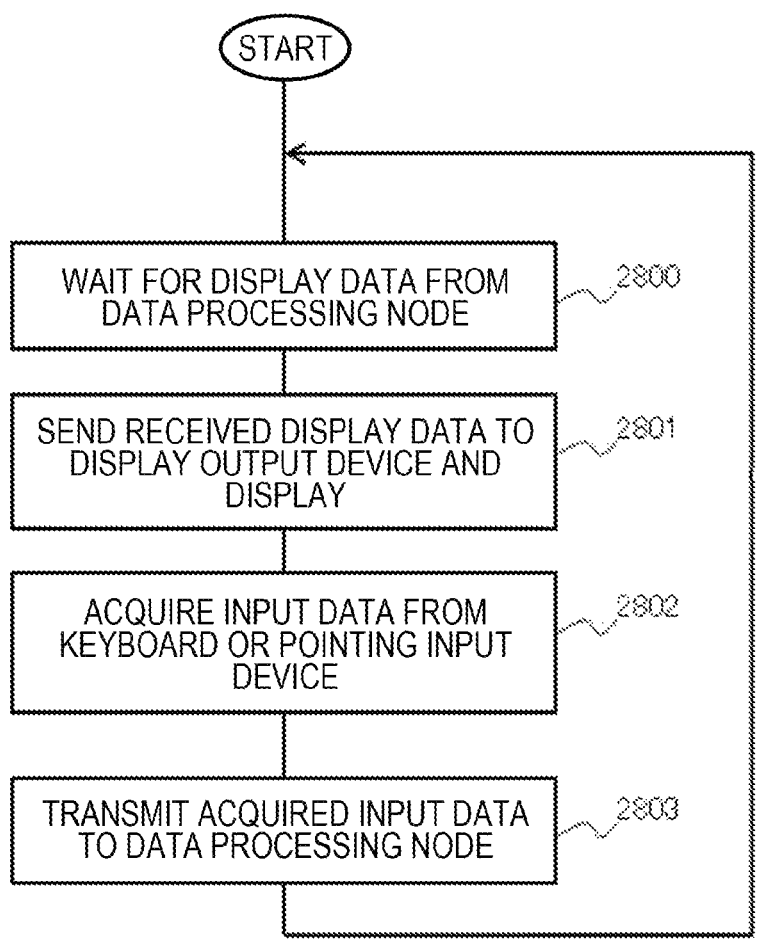
FIG. 26 is a flowchart illustrating an example of a process of an operation terminal program according to an embodiment of the invention.

FIG. 26 is a flowchart illustrating an example of the process of the operation terminal program 710 which is performed by the operation terminal 304. Further, the description below will be given focusing on the process of the operation terminal 304 which performs the operation terminal program 710.

In Step 2800, the operation terminal 304 waits for display data from the data processing node 307. In Step 2801, the operation terminal 304 outputs and displays the display data received from the data processing node 307 to the display 707.

In Step 2802, the operation terminal 304 acquires input data from the keyboard 708 or the pointing device 709.

In Step 2803, the operation terminal 304 transmits the acquired input data to the data processing node 307.

The operation terminal 304 transfers the data with the data processing node 307 by repeating the above process.

FIG. 27 is a flowchart illustrating an example of the process of the container platform program 425 which is performed by the physical servers 401 to 403. Further, the physical servers 401 to 403 are the same, and thus the description below will be given focusing on the process of the physical server 401.

In Step 2900, the physical server 401 waits for a request from the network 305 with the IP address and the port number of the management port. In Step 2901, the physical server 401 determines whether the received request is "Execute node". If the request is "Execute node", Step 2904 is performed. If the request is not "Execute node", Step 2902 is performed.

In Step 2902, the physical server 401 determines whether the received request is "Delete node". If the request is "Delete node", Step 2905 is performed. If the request is not "Delete node", Step 2903 is performed.

In Step 2903, the physical server 401 determines whether the received request is "Check status". If the request is "Check status", Step 2906 is performed. If the request is not "Check status", Step 2906 is performed.

In Step 2904, the physical server 401 selects the container image file which is designated by the request of the node execution, secures a predetermined region in the main memory 404 and the HDD 410, deploys the content of the selected container image file in the secured region, and activates the user program. When the activation is completed, the physical server 401 ends the process in response to the activation completion to the request source of the node execution.

In Step 2905, the physical server 401 stops the execution of the user program of the node having the designated name, and releases the secured region in the main memory 404 and the HDD 410. When the release of the region is completed, the physical server 401 makes a response of the release completion to the request source of the node deletion, and ends the process ends.

In Step 2906, the physical server 401 ends the process in response to the empty capacities of the main memory 404 and the HDD 410. Further, these empty capacities can be acquired by performing a tool or a program provided by the OS. For example, in the Linux OS, there are a "Free" command to investigate the empty memory amount and a "df" command to investigate the empty capacity of the HDD.

With the above process, the container platform program 425 controls the execution and the deletion of the container on the resource of the physical server 401.

FIG. 28 is a block diagram illustrating an example of a container layout. In FIG. 28, there are two representative examples of the container layout.

In this embodiment, the description will be given about an example where a node pool having a lot of empty capacities of the IT resource is specified, and a node (the file storage node 310) is performed. In this case, as illustrated in the exemplary layout 3009, in a case where one node is increased in the status where file storage nodes 3014 to 3016 operate by three nodes 3010, 3011, and 3012, a file storage node 3017 is performed in the fourth node 3013 which is empty in the resource.

As a result, a bandwidth of the connection with the network 305 is increased in addition to the increase in the memory capacity. In a case where the bandwidth is not required, it is possible to avoid that the fourth file storage node 3008 is performed, for example, in a node pool 3001 in which the file storage node 3005 is already performed as illustrated in the exemplary configuration 3000. A priority selection of the setting dialogue 1600 of FIG. 14 may be designated in the display region 1603.

<Conclusions>

As described above, according to this embodiment, it is possible for an operation manager of the data processing system 300 to use the data buffer having a desired performance without designating the performance and the specification of the connected data storage system 303.

The data buffer (the cluster 308) deployed on the physical servers 401 to 403 of the node pool system 302 is assigned with the resources such that the transfer speed with the data storage system 303 satisfies the predetermined request performance. The user of the data buffer may only designate the request performance, and thus does not need to know the performance and the specification of the data storage system 303. Therefore, the operation before starting to use the buffer becomes simple, so that it is possible to reduce a manager's labor on the data processing system.

In addition, in the node pool system 302, it is possible to assign the resources satisfying the request performance without waste by adjusting the number of file storage nodes (containers) of the data buffer. Further, it is possible to efficiently use the computer resources while suppressing a failure in performance.

In addition, this embodiment has been described using an example where the data storage management system 301 is performed by an external computer of the node pool system 302, but the invention is not limited thereto. The data storage management system 301 may be performed by the physical servers 401 and 403 in the node pool system 302. In this case, a data storage management node may be used instead of the data storage management system.

In addition, this embodiment has been described using an example where the correction factor 1205 is used as a value related to the number of increased/decreased nodes to be associated with the data storage system ID 1203 (data storage system 303), and stores the correction factor in the linkage node list 1200 as a history, but the invention is not limited thereto. The history of the number of increased/decreased nodes may be stored in the linkage node list 1200.

In addition, in the above embodiment, the data storage management system 301 has been described about an example in which, when the connection request to the data buffer is received from the data processing node 307, the linkage node 312 measures the performance of data transmission between the data buffer and the data storage system 303, the number of increased/decreased nodes of the file storage node 310 is determined on the basis of the measurement result of the performance, the number of file storage nodes 310 is notified to the node pool system 302 according to the determined number of increased/decreased nodes and the predetermined default number 908 of storage nodes deployed, and the node pool system 302 performs the notified number of file storage nodes 310 to form the cluster 308 as a data buffer. However, the invention is not limited to this example.

For example, in the status where the cluster 308 operates as a data buffer, the data storage management system 301 may cause the linkage node 312 to measure the performance of data transmission between the data buffer and the data storage system 303, the number of increased/decreased nodes of the file storage node 310 may be measured on the basis of the measurement result of the performance, the determined number of increased/decreased nodes may be notified to the node pool system 302, and the node pool system 302 may adjust the number of file storage nodes 310 according to the number of increased/decreased nodes.

Further, the invention is not limited to the above embodiments, but various modifications are included. For example, the embodiments have been described in detail in order to help with understanding on the invention, but the invention is not limited to the one equipped with all the configurations. In addition, some of the configurations of a certain embodiment may be replaced with the one of the other embodiment. In addition, the configuration of the other embodiment may be added to the configuration of a certain embodiment. In addition, some of the configurations of each embodiment may be applied even when the other configurations are added, deleted, or replaced individually or in combination.

In addition, some or all of the configurations, the functions, the processing units, and processing devices may be realized in hardware by designing with an integrated circuit for example. In addition, the configurations and the functions may be realized in software by analyzing and executing a program which realizes the functions of a processor. The information of the program realizing functions, tables, and files may be secured in a recording device such as a memory, a hard disk, a Solid State Drive (SSD) or a recording medium such as an IC card, an SD card, and a DVD.

In addition, only control lines and information lines considered to be necessary for explanation are illustrated, but not all the control lines and the information lines for a product are illustrated. In practice, almost all the configurations may be considered to be connected to each other.

<Supplements>

Further, the invention may be configured as follows:

A control method of a data buffer in which a management computer controls the data buffer provided by a plurality of computers connected to a storage device to store data, the method including:

a first step of controlling, by the plurality of computers, a node pool which is possible to perform, stop, and delete one or more nodes, the node functioning as the data buffer;

a second step of requesting, by the management computer, the node pool to measure a performance of data transmission between the data buffer and the storage device;

a third step of measuring, by the node pool, the performance of data transmission between the data buffer and the storage device on the basis of the request and transmitting the measurement result to the management computer;

a fourth step of receiving, by the management computer, the measurement result of the performance of data transmission between the data buffer and the storage device, and determining a number of increased/decreased nodes on the basis of the measurement result to notify the node pool of the number of increased/decreased nodes; and a fifth step of adjusting, by the node pool, a number of the nodes which function as the data buffer according to the received number of increased/decreased nodes.

The invention claimed is:

1. A data processing system arranged for efficiently using computer resources while suppressing a failure in performance, the data processing system comprising:

a plurality of computers deploying a distributed file system, each of the plurality of computers including a processor and a memory;

a storage device which is connected to the plurality of computers to store data;

a management computer which includes a processor and a memory to control the plurality of computers, wherein the plurality of computers includes a data processing unit that processes data, and a data buffer that retrieves and stores the data processed by the data processing unit from the storage device, wherein the data buffers are distributed among the plurality of computers, each of the plurality of computers transfers data to and from the storage device in parallel, wherein the data processing unit determines a capacity of the data buffer to be used and a data transfer performance of data transmission between the data buffer to be used and the storage device, wherein the management computer measures the data transfer performance of data transmission between the data buffer and the storage device, determines a number of computers among the plurality of computers to meet the data transfer performance set in the data processing unit based on results of the data transfer performance measurement as the number of computers to distribute the data buffer of a predetermined capacity, notifies the plurality of computers of a command to adjust the plurality of computers according to the determined number of computers, adjusts the plurality of computers to the determined number of computers, wherein the plurality of computers distributes a data buffer of a predetermined capacity to the determined number of computers to increase efficient use of computer resources and to suppress a failure of data performance; and, wherein the data processing system additionally comprises a node pool including one or more file storage nodes, and one or more handler nodes for adding or deleting the file storage nodes in the node pool, wherein the data processing system specifies for deletion one or more file storage nodes having the lowest free resource amount, and transmits a list of file storage nodes specified for deletion along with a deletion request to the handler node, and wherein the data processing system waits for the handler node to process the deletion request prior to specifying the list of storage nodes as having been deleted.

2. The data processing system according to claim 1, wherein the management computer includes first management information in which a request performance of data transmission between the data buffer and the storage device is set in advance, and determines the number of computers among the plurality of computers according to the request performance and the results of the performance measurement.

3. The data processing system according to claim 1, wherein the storage device includes a plurality of storage devices, wherein the management computer records a history of values related to the determined number of computers among the plurality of computers in a second management information with respect to each of the plurality of storage devices, wherein, in a case where a history of the same storage device as the storage device connected to the data buffer exists in the second management information, the management computer calculates the number of computers among the plurality of computers from the history of the second management information instead of measuring the performance of data transmission.

4. The data processing system according to claim 3, wherein, in a case where a plurality of histories of the same storage device exists in the second management information, the management computer calculates the number of computers among the plurality of computers on the basis of a result obtained by performing a predetermined statistic processing on the plurality of histories.

5. The data processing system according to claim 2, wherein the data processing system additionally comprises a node pool, the node pool including one or more first nodes which functions as a data buffer and includes a second node which is a data processing node which makes an access to the data buffer, wherein the second node transmits a connection request to the data buffer toward the management computer, wherein the management computer causes the node pool to perform the first node when receiving the connection request to the data buffer from the second node.

6. The data processing system according to claim 5, wherein the first management information includes an initial value of the number of first nodes which are performed by the node pool, wherein the management computer causes the node pool to perform the first node by a number corresponding to the initial value when receiving the connection request to the data buffer from the second node.

7. The data processing system according to claim 6, wherein the storage device includes a plurality of storage devices, each of which has a different recording medium, wherein the initial value and the request performance are set in advance for every storage device of which the recording medium is different in the first management information.

8. A data processing system arranged for efficiently using computer resources while suppressing a failure in performance, the data processing system comprising:

a plurality of computers deploying a distributed file system, each of the plurality of computers including a processor and a memory;

a storage device which is connected to the plurality of computers to store data, wherein the plurality of computers includes a data processing unit that processes data, and a data buffer that retrieves and stores the data processed by the data processing unit from the storage device, wherein the data buffers are distributed among the plurality of computers, each of the plurality of computers transfers data to and from the storage device in parallel, wherein the data processing unit determines a capacity of the data buffer to be used and data transfer performance of data transmission between the data buffer to be used and the storage device, wherein, when receiving a request of measurement, the management computer measures a data transfer performance of data transmission between the data buffer and the storage device, and makes a response with a measurement result of the data transfer performance, wherein, when receiving a notification of performing or deleting one or more computers among the plurality of computers, adjusting a number of computers among the plurality of computers based upon the notification to increase efficient use of computer resources and to suppress a failure of data performance; and, wherein the data processing system additionally comprises a node pool including one or more file storage nodes, and one or more handler nodes for adding or deleting the file storage nodes in the node pool, wherein the data processing system specifies for deletion one or more file storage nodes having the lowest free resource amount, and transmits a list of file storage nodes specified for deletion along with a deletion request to the handler node, and wherein the data processing system waits for the handler node to process the deletion request prior to specifying the list of storage nodes as having been deleted.

* * * * *